(12) United States Patent
Sakurai

(10) Patent No.: US 8,384,951 B2
(45) Date of Patent: Feb. 26, 2013

(54) IMAGE GENERATING DEVICES AND PRINTING DEVICES THAT GENERATE GRADATIONS USING SYMMETRY AND METHODS FOR GENERATING GRADATIONS USING SYMMETRY

(75) Inventor: Kunihiko Sakurai, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 972 days.

(21) Appl. No.: 12/412,348

(22) Filed: Mar. 26, 2009

(65) Prior Publication Data

US 2009/0290176 A1 Nov. 26, 2009

(30) Foreign Application Priority Data

Mar. 31, 2008 (JP) ................................. 2008-093386

(51) Int. Cl.
*G06K 9/32* (2006.01)
(52) U.S. Cl. ........................................ 358/1.9; 382/293
(58) Field of Classification Search .................. None
See application file for complete search history.

(56) References Cited

U.S. PATENT DOCUMENTS

| | | | |
|---|---|---|---|
| 4,635,131 A | 1/1987 | Terada et al. | |
| 6,166,745 A * | 12/2000 | Saito | 345/441 |
| 6,201,550 B1 | 3/2001 | Sakamoto | |
| 6,870,954 B1 * | 3/2005 | Gupta | 382/162 |
| 6,985,260 B1 | 1/2006 | Ozawa | |
| 8,040,566 B2 * | 10/2011 | Tsugimura | 358/3.01 |
| 2005/0237574 A1 | 10/2005 | Ozawa | |

FOREIGN PATENT DOCUMENTS

| | | | |
|---|---|---|---|
| AU | 2005/201375 | * | 3/2005 |
| AU | 2005-201375 A1 | | 10/2006 |
| JP | S61-091661 A | | 5/1986 |
| JP | 62 072078 | * | 4/1987 |
| JP | S62-072078 A | | 4/1987 |
| JP | H05-006439 A | | 1/1993 |
| JP | H07-182400 A | | 7/1995 |
| JP | H08-212362 A | | 8/1996 |
| JP | H11-031231 A | | 2/1999 |
| JP | 2000-138816 A | | 5/2000 |
| JP | 2001-101431 A | | 4/2001 |

OTHER PUBLICATIONS

Microsoft RadialGradientBrush Members.*

(Continued)

*Primary Examiner* — Twyler Haskins
*Assistant Examiner* — Christopher D Wait
(74) *Attorney, Agent, or Firm* — Baker Botts L.L.P.

(57) ABSTRACT

An image generating device for generating a gradation in which the color value changes from a center of the gradation through multiple areas includes an acquisition unit that acquires parameters representing a gradation pattern including the center and shape of the gradation, a symmetry judgment unit that judges whether the gradation symmetry is satisfied (condition that the shape has line symmetry or point symmetry and the gradation center is on a line symmetry axis or at the center of point symmetry), an area determination unit that determines a partial area usable for generating a whole gradation using the gradation symmetry if the gradation symmetry is judged to be satisfied, a drawing unit that draws the gradation in the partial area based on the parameters, and a gradation development unit that develops the drawn gradation into the whole gradation using the gradation symmetry.

21 Claims, 10 Drawing Sheets

OTHER PUBLICATIONS

European Patent Office, extended European Search Report for European Patent Application No. 09250943.9, dated May 13, 2011.
The State Intellectual Property Office of the People's Republic of China, Notification of First Office Action for Chinese Patent Application No. 200910133026.2, issued Mar. 9, 2011.
Japan Patent Office; Notification of Reasons of Rejection in Japanese Patent Application No. 2008-093386 mailed Apr. 27, 2010.
Sonoe Takigami; "Kyutai-de Asobu (Play with Sphere)" Design Plex, vol. 11, pp. 98-99, Feb. 18, 1998, BNN Inc., Japan.

* cited by examiner

```
<RadialGradientBrush
    MappingMode="Absolute"
    Center="150, 150"
    GradientOrigin="200, 170"
    RadiusX="140"
    RadiusY="100">
    <RadialGradientBrush.GradientStops>
        <GradientStop Color="#FFFF00" Offset="0" />
        <GradientStop Color="#0000FF" Offset="1" />
    </RadialGradientBrush.GradientStops>
</RadialGradientBrush>
```

- 31 — Center="150, 150"
- 32 — GradientOrigin="200, 170"
- 33 — RadiusX="140"
- 34 — RadiusY="100">
- 35 — GradientStops
  - 35a — <GradientStop Color="#FFFF00" Offset="0" />
  - 35b — <GradientStop Color="#0000FF" Offset="1" />

Center="Cx, Cy" : CENTER COORDINATES OF ELLIPTICAL SHAPE (Cx, Cy)
GradientOrigin="Gx, Gy" : CENTER COORDINATES OF GRADATION (Gx, Gy)
RadiusX="Rx" : X-RADIUS (RADIUS IN X-AXIS DIRECTION) Rx
RadiusY="Ry" : Y-RADIUS (RADIUS IN Y-AXIS DIRECTION) Ry
GradientStop Color="#RsGsBs" Offset="0"
 : COLOR VALUES AT CENTER OF GRADATION Rs, Gs, Bs
GradientStop Color="#ReGeBe" Offset="1"
 : COLOR VALUES AT PERIPHERY OF ELLIPSE Re, Ge, Be

FIG.2A

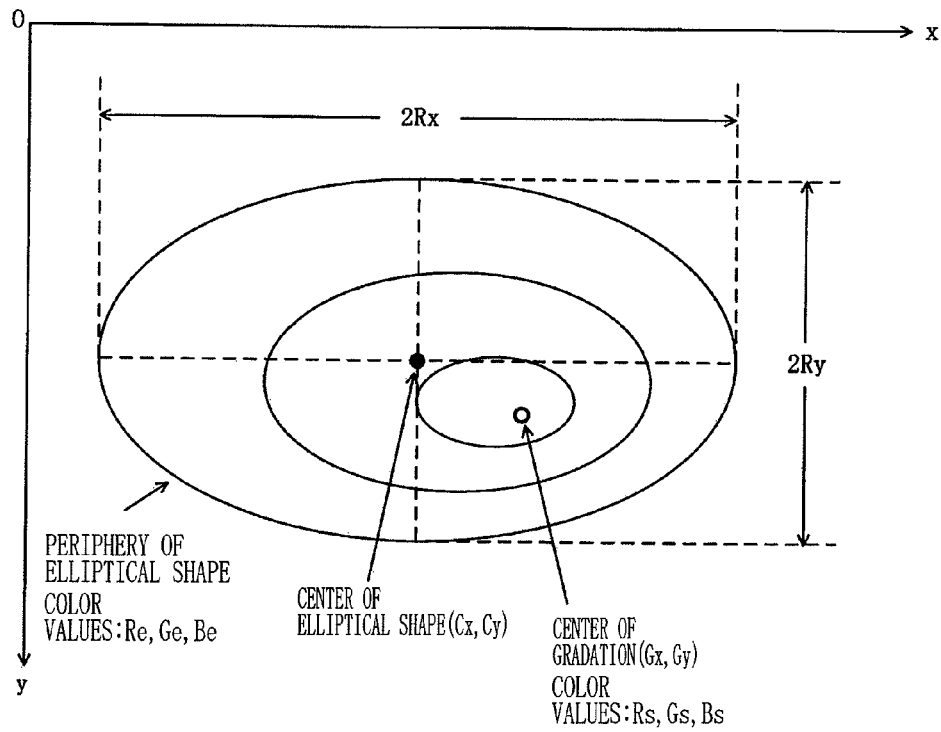

FIG.2B

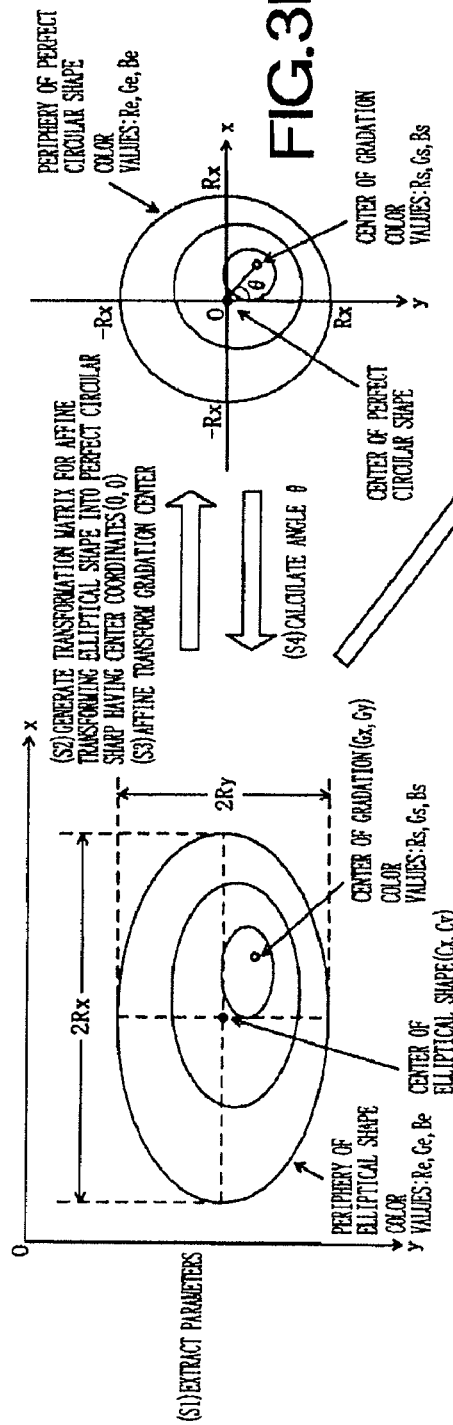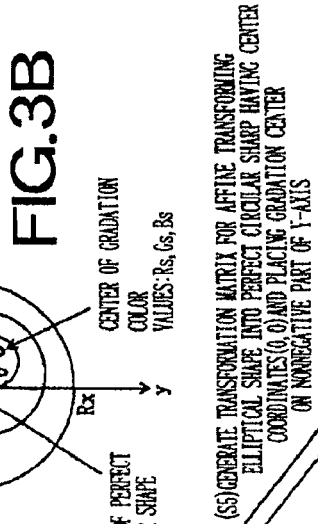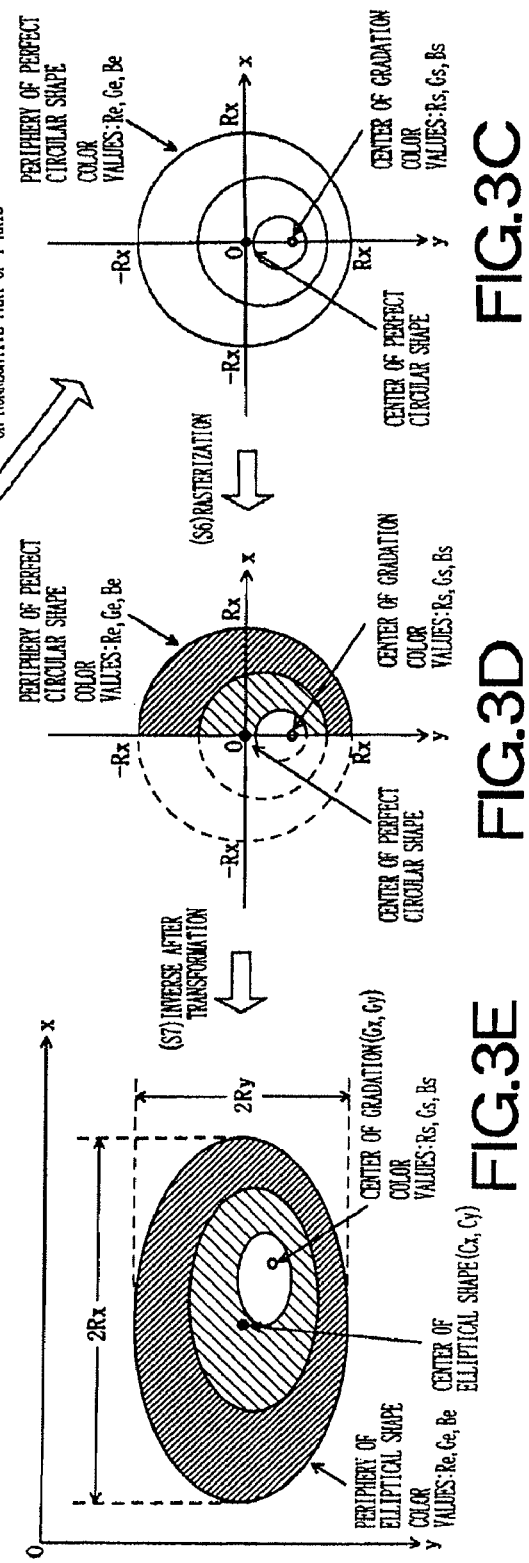

IMAGE GENERATING DEVICES AND PRINTING DEVICES THAT GENERATE GRADATIONS USING SYMMETRY AND METHODS FOR GENERATING GRADATIONS USING SYMMETRY

CROSS-REFERENCE TO RELATED APPLICATION

This application claims priority under 35 U.S.C. §119 from Japanese Patent Application No. 2008-093386 filed on Mar. 31, 2008. The entire subject matter of the application is incorporated herein by reference.

BACKGROUND

1. Technical Field

The present invention relates to an image generating device, an image generating method and a printing device.

2. Prior Art

With the evolving high performance of document preparation systems and document printing systems using computers in recent years, there are increasing desires of users for realizing complicated expression in drawing. For example, gradation (gradually changing the color in a prescribed drawing area) is being used a lot for effective presentation, for expressing three-dimensional shapes, etc.

In order to print such a gradation (i.e. an image having gradation) with a printer or display such a gradation on a display, it is necessary to generate a gradation pattern in the bitmap format and draw the gradation pattern on a page memory or frame memory.

In conventional techniques, the drawing of a gradation is carried out by successively drawing (overlaying) multiple areas slightly differing in the color value while gradually shifting the drawing position of each area. For example, in order to draw a gradation in which the color changes smoothly in a pattern like concentric circles, a large circle is drawn first and filled in with a prescribed color. Subsequently, a slightly smaller circle is drawn in (overlaid on) the previously drawn (filled) circle and filled in with a different color. The process is repeated many times until the drawing position (currently drawn circle) gets close enough to the center of the concentric circles (see Japanese Patent Provisional Publication No. HEI 11-31231 (hereinafter referred to as a "patent document #1"), for example).

SUMMARY OF THE INVENTION

However, the gradation drawing method described in the patent document #1 requires repeated execution of the fill-in process (filling in a circle with a specified color) and that leads to a heavy processing load regarding the gradation drawing.

The present invention, which has been made in consideration of the above problems, is advantageous in that an image generating device, an image generating method and a printing device, capable of generating a gradation in which the color value changes from the center of the gradation through multiple areas in a prescribed shape while reducing the load related to the drawing of the gradation, can be provided.

In accordance with an aspect of the present invention, there is provided an image generating device for generating an image including a gradation in which a color changes from a center of the gradation through multiple areas. The image generating device includes an acquisition unit that acquires parameters representing a gradation pattern, the parameters specifying the center of the gradation and a shape of the gradation, a symmetry judgment unit that judges whether or not a gradation symmetry is satisfied, wherein the gradation symmetry is judged to be satisfied in the case where the shape of the gradation specified by the parameters has line symmetry or point symmetry and the center of the gradation is on a symmetry axis of the line symmetry or at the center of the point symmetry, an area determination unit that determines a partial area usable for generating a whole area of the gradation by use of the gradation symmetry, if the gradation symmetry is judged to be satisfied, a drawing unit that draws the gradation in the partial area based on the parameters acquired by the acquisition unit, and a gradation development unit that develops the gradation drawn in the partial area into the whole area of the gradation using the gradation symmetry.

With the image generating device configured as above, in the process for generating a gradation in which the color value (specifying color) changes from the center of the gradation through multiple areas in a prescribed shape, when the gradation is judged by the symmetry judgment unit to satisfy the gradation symmetry (a condition that the shape has line symmetry or point symmetry and the center of the gradation is on a symmetry axis of the line symmetry or at the center of the point symmetry) based on the parameters specifying the gradation pattern acquired by the acquisition unit, a partial area of the gradation usable for generating the whole area of the gradation is determined by the area determination unit by use of the gradation symmetry. For the area determined by the area determination unit, the gradation is drawn by the drawing unit based on the parameters acquired by the acquisition unit. Since the gradation is drawn just for the partial area determined by the area determination unit when the gradation to be generated satisfies the gradation symmetry, the load related to the drawing can be reduced compared to cases where the gradation is drawn for the whole area. Further, since the gradation drawn by the drawing unit is developed by the gradation development unit into the whole area of the gradation using the gradation symmetry, the whole of the gradation (throughout the whole area) can be generated with ease. Therefore, an image generating device, capable of generating a gradation in which the color value changes from the center of the gradation through multiple areas in a prescribed shape while reducing the load related to the drawing of the gradation, can be obtained.

According to further aspects of the invention, there is provided a printing device including the image generating unit as described above and a printing unit that prints the image generated by the image generating unit on a print medium.

According to other aspects of the invention, there is provided an image generating method for generating an image including a gradation in which a color changes from the center of a gradation through multiple areas. The method includes an acquisition step of acquiring parameters representing a gradation pattern, the parameters specifying the center of the gradation and a shape of the gradation, a symmetry judgment step of judging whether or not the gradation symmetry is satisfied, wherein the gradation symmetry is judged to be satisfied in the case where the shape of the gradation specified by the parameters has line symmetry or point symmetry, and the center of the gradation is on a symmetry axis of the line symmetry or at the center of the point symmetry, an area determination step of determining a partial area usable for generating a whole area of the gradation by use of the gradation symmetry if the gradation symmetry is judged to be satisfied, a drawing step of drawing the gradation in the partial area based on the parameters acquired by the acquisition step, and a gradation development step of developing the gradation drawn in the partial area into the whole area of the gradation using the gradation symmetry.

Other objects, features and advantages of the present invention will become more apparent from the consideration of the following detailed description taken in conjunction with the accompanying drawings.

BRIEF DESCRIPTION OF THE ACCOMPANYING DRAWINGS

FIG. 2A is a schematic diagram showing an example of a RadialGradientBrush element and parameters specified by the element.

FIG. 2B is a schematic diagram showing an example of an elliptical radial gradation which is drawn according to the parameters specified by the RadialGradientBrush element.

FIGS. 3A-3E are schematic diagrams for explaining principles for drawing an elliptical radial gradation employed in the embodiment.

DETAILED DESCRIPTION OF THE EMBODIMENTS

Figure 1:
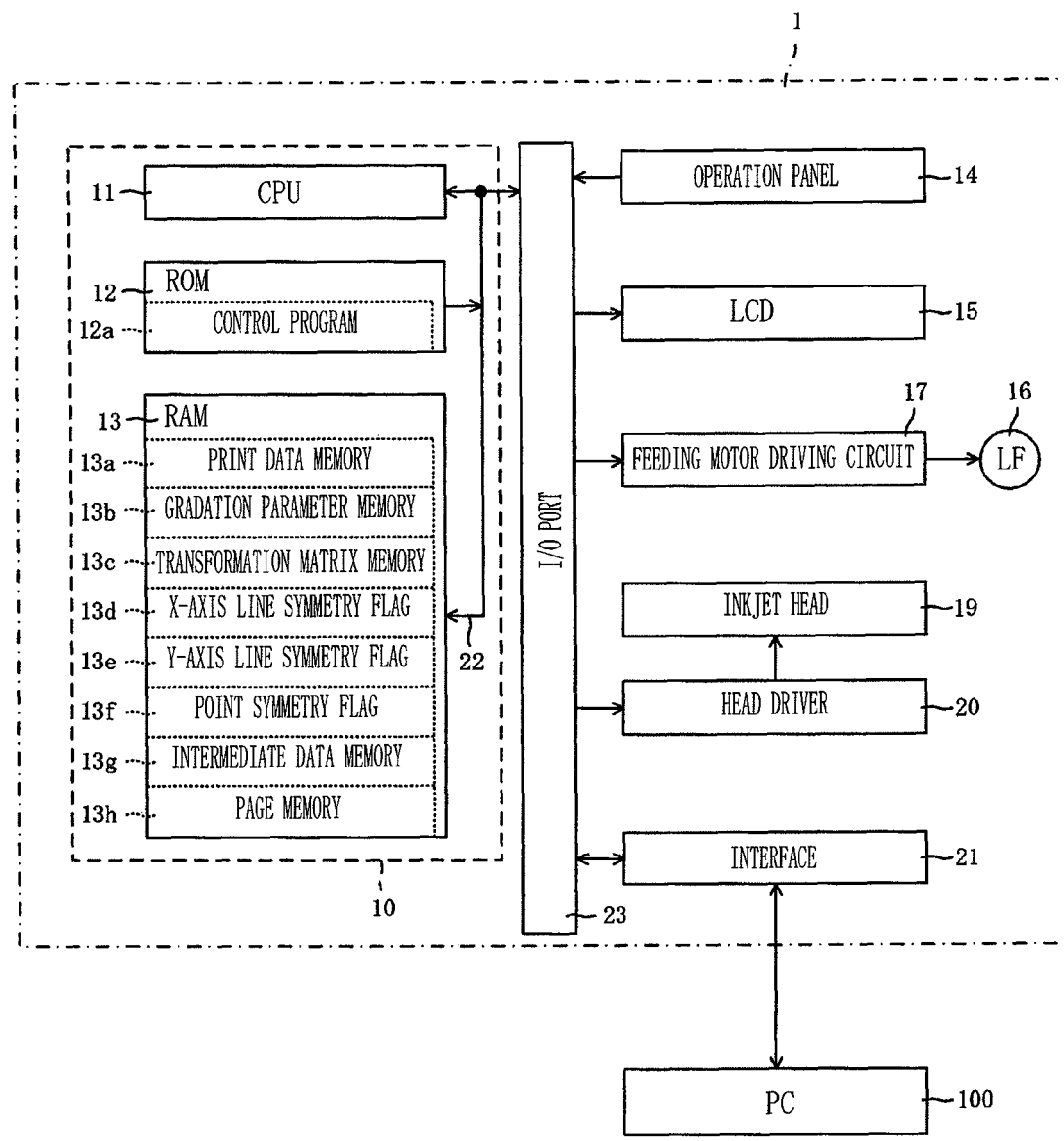
FIG. 1 is a block diagram showing the electrical configuration of a printer (including a printer control unit) in accordance with an embodiment of the present invention.

Referring now to the drawings, a description will be given in detail of a preferred embodiment in accordance with the present invention.

<Embodiment 1>

FIG. 1 is a block diagram showing the electrical configuration of a printer 1 (including a printer control unit 10) in accordance with an embodiment of the present invention.

The printer 1 (inkjet printer equipped with an inkjet head 19) is a peripheral device for executing printing by discharging ink drops from nozzles of the inkjet head 19 toward a sheet (e.g. paper). The printer control unit 10 is a unit for controlling the overall operation of the printer 1 while generating image data to be printed by the printer 1.

The printer 1 is connected to a PC (Personal Computer) 100 via a communication cable or wireless communication. When a print command transmitted from the PC 100 is received, print data (described in a PDL (Page Description Language)) transmitted from the PC 100 together with the print command is analyzed and image data according to the print data is generated by the printer control unit 10, and then an image according to the generated image data is printed on a sheet by the inkjet head 19.

In this case, if an image drawing instruction ordering the drawing of a gradation in which the color value changes radially from the center of the gradation through multiple areas in a prescribed shape (perfect circle, ellipse, quadrangle, etc.) is included in the print data, the radial gradation in the prescribed shape specified by the image drawing instruction is generated by the printer control unit 10 of the printer 1.

The printer control unit 10 is configured to be capable of generating the radial gradation while reducing the load related to the drawing of the radial gradation. Incidentally, such a gradation in which the color value changes radially from the center of the gradation through multiple areas in a prescribed shape will be referred to as a "radial gradation in a (the) prescribed shape" in the following explanation.

Next, the detailed configuration of the printer 1 of this embodiment will be described below. As shown in FIG. 1, the printer 1 is equipped with an operation panel 14, an LCD (Liquid Crystal Display) 15, a feeding motor (LF motor) 16, a feeding motor driving circuit 17, the inkjet head 19, a head driver 20 and an interface 21, as well as the printer control unit 10.

Among the components, the operation panel 14, the LCD 15, the feeding motor driving circuit 17, the head driver 20 and the interface 21 are connected to the printer control unit 10 via an I/O port 23. The feeding motor 16 is connected to the feeding motor driving circuit 17. The inkjet head 19 is connected to the head driver 20.

The printer control unit 10 includes a CPU (Central Processing Unit) 11, a ROM (Read Only Memory) 12 and a RAM (Random Access Memory) 13, which are connected together by a bus line 22. The bus line 22 is connected to the I/O port 23, via which signals are communicated between the printer control unit 10 and each component connected to the I/O port 23.

The CPU 11 is a processor for controlling the printer 1 and generating image data to be printed by the printer 1 according to programs and fixed values (data) stored in the ROM 12 and the RAM 13, various signals received from the PC 100 via the interface 21, etc.

The ROM 12 is a non-rewritable nonvolatile memory storing a control program 12a to be executed by the CPU 11, fixed values to be referred to by the control program 12a, etc. Programs necessary for executing a printing process, a radial gradation rasterization process, a drawing process, an elliptical radial gradation rasterization process and a perfect circular radial gradation rasterization process (shown in flow charts of FIGS. 5-9, respectively) are all included in the control program 12a.

The program for the printing process (flow chart of FIG. 5) is run by the CPU 11 when a print command is received from the PC 100 via the interface 21, by which print data, such as an electronic document described according to XPS (XML Paper Specification) (hereinafter referred to as an "XPS document"), received from the PC 100 together with the print command is analyzed and an image (image data) according to the print data is generated.

Figure 6:
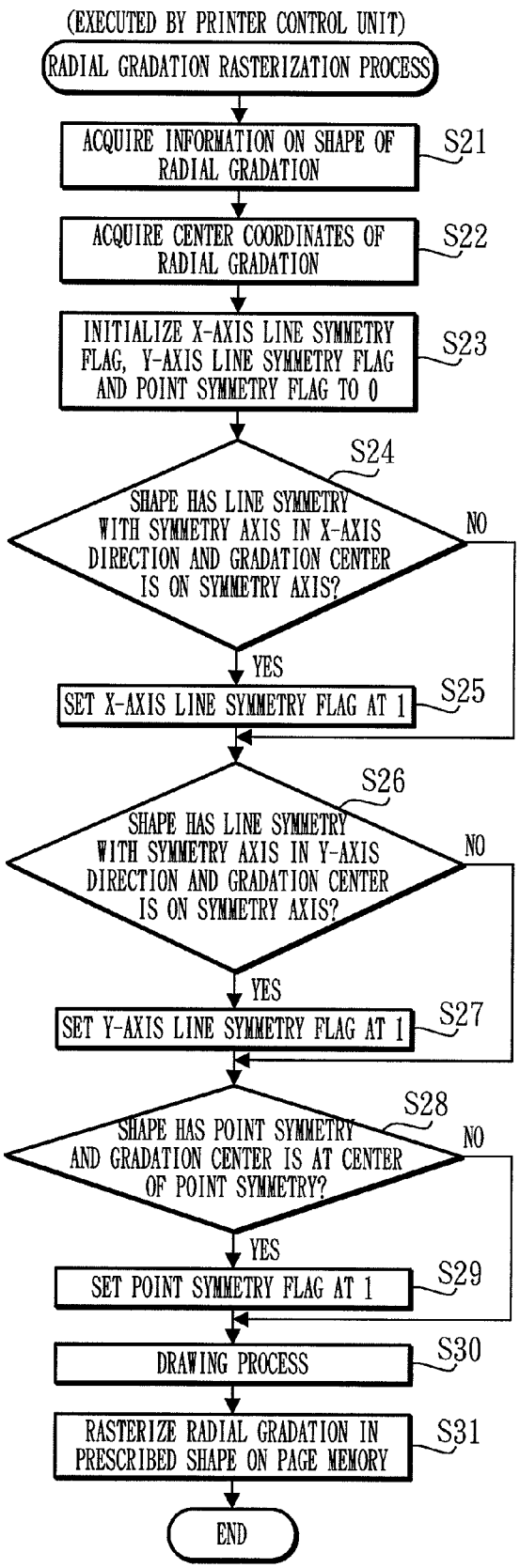
FIG. 6 is a flow chart of a radial gradation rasterization process which is executed by the printer control unit.
Figure 7:
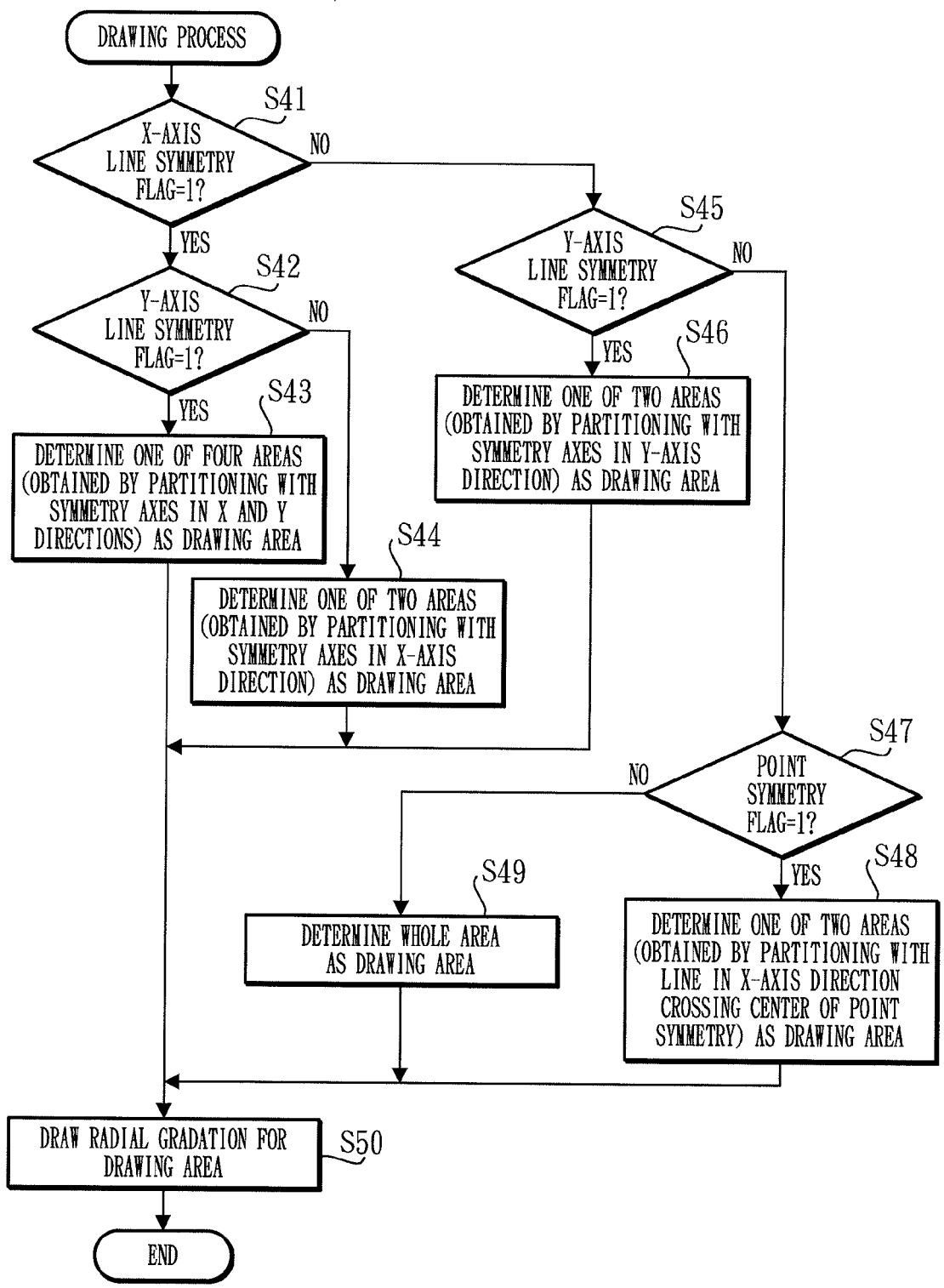
FIG. 7 is a flow chart of a drawing process which is executed by the printer control unit.

The program for the radial gradation rasterization process (flow chart of FIG. 6) is run by the CPU 11 as a subroutine of the program for the printing process (FIG. 5) when print data that is not an XPS document is received and the print data includes an instruction for drawing a radial gradation in a prescribed shape By running the program for the radial gradation rasterization process (FIG. 6), the CPU 11 judges gradation symmetry of the radial gradation in the prescribed shape specified by the drawing instruction and then runs the program for the drawing process (FIG. 7). When the radial gradation in the prescribed shape satisfies certain gradation symmetry, the CPU 11 determines a partial area of the gradation usable for generating the whole area of the gradation (i.e. the whole of the gradation) based on the gradation symmetry and then draws the gradation for the determined area (rasterizes the gradation on an intermediate data memory 13g which will be explained later).

In subsequent steps of the radial gradation rasterization process, the CPU 11 rasterizes the whole area of the radial gradation on a page memory 13h (explained later) using the radial gradation rasterized on the intermediate data memory 13g taking advantage of the gradation symmetry.

Figure 9:
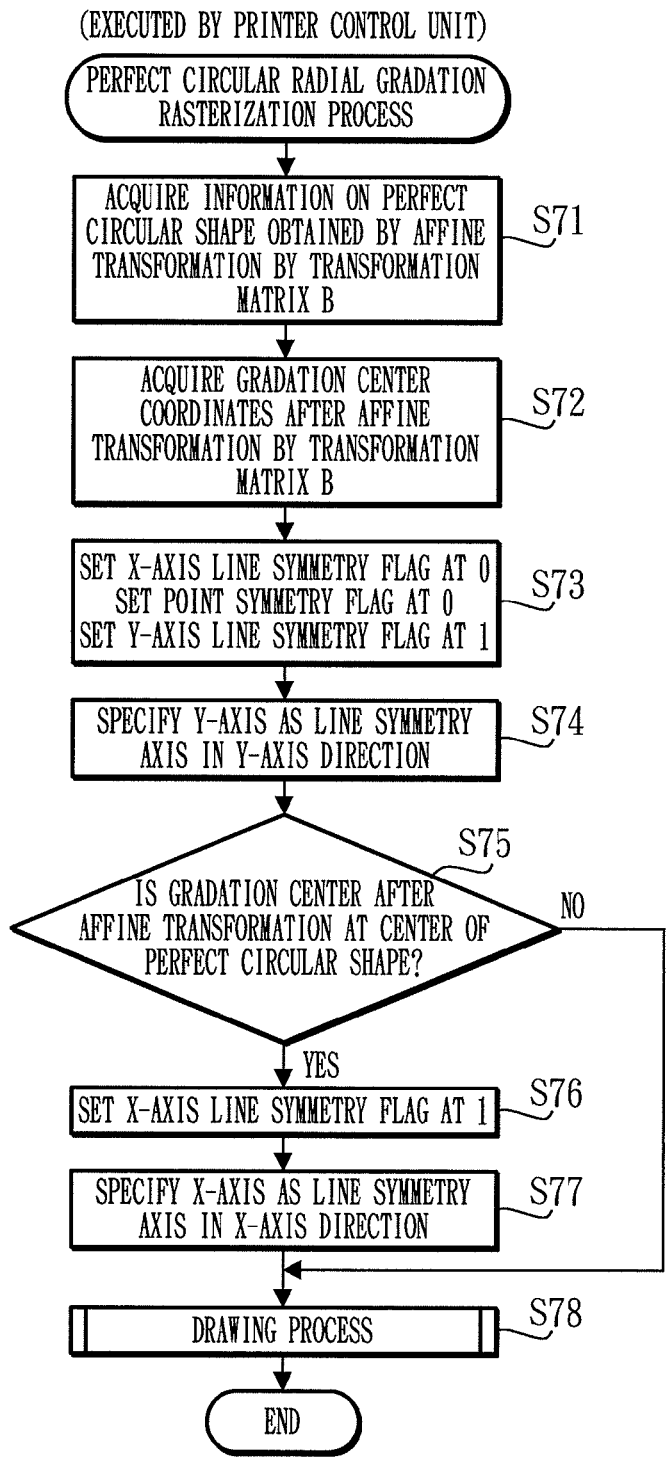
FIG. 9 is a flow chart of a perfect circular radial gradation rasterization process which is executed by the printer control unit.

The program for the drawing process (flow chart of FIG. 7) is run by the CPU 11 as a subroutine of the program for the radial gradation rasterization process (FIG. 6) or as a subroutine of the program for the perfect circular radial gradation rasterization process (FIG. 9). When the radial gradation in a prescribed shape satisfies certain gradation symmetry as mentioned above, the CPU 11 determines a partial area of the gradation usable for generating the whole area of the gradation based on the gradation symmetry and draws the gradation for the determined area.

The program for the elliptical radial gradation rasterization process (flow chart of FIG. 8) is run by the CPU 11 as a subroutine of the program for the printing process (FIG. 5) when an XPS document is received as the print data and the XPS document includes a RadialGradientBrush element as an instruction for drawing an elliptical radial gradation (radial gradation in an elliptical shape).

By running the program for the elliptical radial gradation rasterization process (FIG. 8), the CPU 11 generates a transformation matrix for affine transformation of an elliptical shape specified by the RadialGradientBrush element into a perfect circular shape (with its center placed on the origin) and then executes the program for the perfect circular radial gradation rasterization process (FIG. 9), by which a gradation is drawn for the perfect circular shape and the drawn gradation (perfect circular radial gradation) is rasterized on the intermediate data memory 13g. Subsequently, the CPU 11 calculates the inverse matrix of the transformation matrix used for the affine transformation, and generates the elliptical radial gradation specified by the RadialGradientBrush element by inversely affine transforming the perfect circular shape (in which the gradation has been drawn) by use of the inverse matrix. The details of the principles for the drawing of the elliptical radial gradation employed in this embodiment will be explained later with reference to FIGS. 3A-3E.

The program for the perfect circular radial gradation rasterization process (flow chart of FIG. 9) is run by the CPU 11 as a subroutine of the program for the elliptical radial gradation rasterization process (FIG. 8), by which a gradation (perfect circular radial gradation) is drawn for the perfect circular shape obtained by the affine transformation of the elliptical shape as mentioned above.

By running the program for the perfect circular radial gradation rasterization process (FIG. 9), the CPU 11 judges the gradation symmetry of the perfect circular radial gradation based on the positional relationship between the center of the perfect circular shape and the center of the radial gradation which will be explained later (details of the judgment will be explained later referring to FIG. 3D) and then executes the program for the drawing process (FIG. 7). In the drawing process, a partial area of the gradation usable for generating the whole area of the gradation is determined by use of the gradation symmetry, and the gradation is drawn for the determined area (rasterized on the intermediate data memory 13g).

The RAM 13 is a rewritable volatile memory for temporarily storing various data. Storage areas such as a print data memory 13a, a gradation parameter memory 13b, a transformation matrix memory 13c, an X-axis line symmetry flag 13d, a Y-axis line symmetry flag 13e, a point symmetry flag 13f, the intermediate data memory 13g and the page memory 13h are reserved in the RAM 13.

The print data memory 13a is memory (storage area) for temporarily storing the print data (e.g. XPS document) received from the PC 100 together with the print command. Upon reception of print data from the PC 100, the interface 21 transfers the received print data to the print data memory 13a of the RAM 13 by means of DMA (Direct Memory Access), by which the print data received from the PC 100 is stored in the print data memory 13a.

The print data stored in the print data memory 13a is read out and the contents of the print data are analyzed by the CPU 11 when the printing process (see FIG. 5, explained later) is executed. The CPU 11 generates image data to be printed by the printer 1 by executing an image drawing process according to the contents of the print data, and stores the generated image data in the page memory 13h.

The gradation parameter memory 13b is memory for storing parameters specifying a gradation pattern (hereinafter referred to also as "gradation pattern parameters") which are included in the image drawing instruction ordering the drawing of a radial gradation in a prescribed shape. The gradation pattern parameters include parameters specifying the prescribed shape of the radial gradation, parameters specifying center coordinates of the radial gradation, etc.

Figure 5:
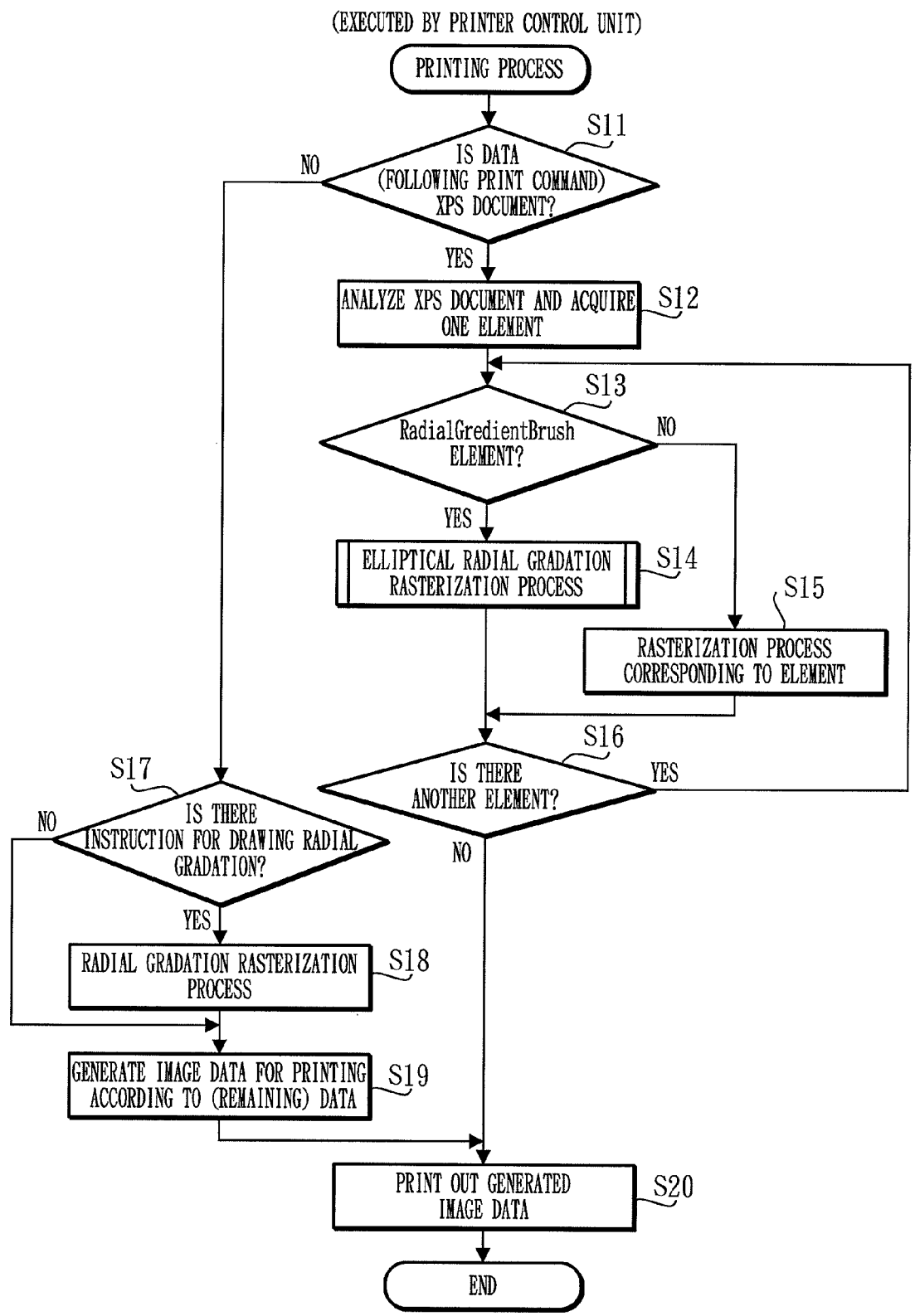
FIG. 5 is a flow chart of a printing process which is executed by the printer control unit.

In cases where print data that is not an XPS document has been stored in the print data memory 13a and the print data includes an image drawing instruction ordering the drawing of a radial gradation in a prescribed shape, the CPU 11 acquires the gradation pattern parameters (specifying a gradation pattern to be drawn in the prescribed shape) from the image drawing instruction and stores the acquired gradation pattern parameters in the gradation parameter memory 13b in the radial gradation rasterization process (FIG. 6) which is executed in the printing process (FIG. 5).

The gradation pattern parameters stored in the gradation parameter memory 13b are referred to not only for drawing the radial gradation but also for the judgment on whether the radial gradation a the prescribed shape satisfies the gradation symmetry or not.

Specifically, the CPU 11 judges whether or not the prescribed shape has line symmetry or point symmetry based on the parameters specifying the prescribed shape stored in the gradation parameter memory 13b while also judging whether or not the center of the radial gradation is on the symmetry axis of the line symmetry or at the center of the point symmetry based on the parameters specifying the center coordinates of the radial gradation. When the judgments are both affirmative, that is, when the prescribed shape has line symmetry or point symmetry and the center of the radial gradation is on the symmetry axis of the line symmetry or at the center of the point symmetry, the CPU 11 judges that the radial gradation in the prescribed shape satisfies the gradation symmetry.

Meanwhile, in cases where an XPS document has been stored in the print data memory 13a and the XPS document includes a RadialGradientBrush element (image drawing instruction ordering the drawing of an elliptical radial gradation), the CPU 11 acquires the gradation pattern parameters (specifying a gradation pattern to be drawn in the elliptical shape, such as parameters specifying the elliptical shape (elliptical shape parameters) and parameters specifying the center coordinates of the elliptical radial gradation) from the RadialGradientBrush element and stores the acquired gradation pattern parameters in the gradation parameter memory 13b in the elliptical radial gradation rasterization process (FIG. 8) which is executed in the printing process (FIG. 5). The details of the RadialGradientBrush element included in an XPS document and the parameters included in the element will be explained later with reference to FIGS. 2A and 2B.

Among the parameters stored in the gradation parameter memory 13b, the parameters specifying an elliptical shape are used for generating the transformation matrix for the affine transformation of the elliptical shape into the perfect circular shape (with its center placed on the origin).

Among the parameters stored in the gradation parameter memory 13b, the center coordinates of the radial gradation (see FIGS. 2A and 2B) are affine transformed by use of the above transformation matrix. The gradation center coordinates after undergoing the affine transformation and the radius and center coordinates of the perfect circular shape obtained by the affine transformation of the elliptical shape are also stored in the gradation parameter memory 13b.

In the perfect circular radial gradation rasterization process (FIG. 9), the CPU 11 generates a perfect circular radial gradation (a radial gradation in the perfect circular shape obtained by the affine transformation of the elliptical shape) based on the parameters stored in the gradation parameter memory 13b.

In this case, the CPU 11 judges the symmetry type of the perfect circular radial gradation by (judging that the perfect circular radial gradation satisfies the gradation symmetry and than) judging whether or not the gradation center coordinates after the affine transformation coincide with the center coordinates of the perfect circular shape obtained by the affine transformation of the elliptical shape.

Specifically, when the gradation center coordinates after the affine transformation coincide with the center coordinates of the perfect circular shape, the CPU 11 judges that the perfect circular radial gradation has line symmetry with two symmetry axes crossing at right angles at the center of the perfect circular shape, otherwise the CPU 11 judges that the perfect circular radial gradation has line symmetry with a symmetry axis as a line connecting the center of the radial gradation and the center of the perfect circular shape.

Incidentally, while the perfect circular radial gradation actually has line symmetry with an infinite number of symmetry axes crossing the center of the perfect circular shape in the above case where the gradation center coordinates after the affine transformation coincide with the center coordinates of the perfect circular shape, the CPU 11 in this embodiment judges the perfect circular radial gradation to have the line symmetry with two symmetry axes crossing at right angles at the center of the perfect circular shape for simplification of the process.

The transformation matrix memory 13c is memory for storing the transformation matrix for the affine transformation from the elliptical shape (specified by the RadialGradientBrush element in the XPS document) into the perfect circular shape. By executing the elliptical radial gradation rasterization process (see FIG. 8, explained later), the CPU 11 generates the transformation matrix for the affine transformation from the elliptical shape into the perfect circular shape (with its center placed on the origin) based on the elliptical shape parameters stored in the gradation parameter memory 13b and then stores the generated transformation matrix in the transformation matrix memory 13c.

The transformation matrix stored in the transformation matrix memory 13c is used for the affine transformation of the gradation center coordinates (see FIGS. 2A and 2B) included in the gradation pattern parameters stored in the gradation parameter memory 13b.

In this case, if the gradation center coordinates after the affine transformation are not on a nonnegative part of the Y-axis, the CPU 11 generates a new transformation matrix by adding a rotational element to the original transformation matrix so that the gradation center coordinates after the affine transformation will be placed on the nonnegative part of the Y-axis. Incidentally, the Y-axis is an axis representing the vertical direction of a printing area. The positive Y-axis (representing the positive Y direction) extends downward from the origin which is set at the upper left corner of the printing area.

The newly generated transformation matrix is stored in the transformation matrix memory 13c by overwriting the original transformation matrix. The rotational element (which is added to the original transformation matrix) will be explained later with reference to FIGS. 3A-3E.

The gradation center coordinates (see FIGS. 2A and 2B) stored in the gradation parameter memory 13b are affine transformed again by use of the transformation matrix finally stored in the transformation matrix memory 13c (i.e. the transformation matrix to which the rotational element has been added). The gradation center coordinates after undergoing the affine transformation are stored in the gradation parameter memory 13b as gradation center coordinates of the perfect circular radial gradation.

Based on the gradation pattern parameters (specifying the gradation pattern to be drawn in the elliptical shape) stored in the gradation parameter memory 13b (including the gradation center coordinates after undergoing the affine transformation again), the CPU 11 draws a gradation for the perfect circular shape obtained by the affine transformation.

For the transformation matrix finally stored in the transformation matrix memory 13c (i.e. the transformation matrix to which the rotational element has been added), the inverse matrix is calculated by the CPU 11. Then, the elliptical radial gradation specified by the RadialGradientBrush element is generated by the CPU 11 by inversely affine transforming the perfect circular shape (in which the gradation has been drawn) by use of the calculated inverse matrix.

The X-axis line symmetry flag 13d is a flag indicating whether or not the radial gradation in a prescribed shape has line symmetry with a symmetry axis parallel to the X-axis. The X-axis line symmetry flag 13d set at "1" indicates that the radial gradation in the prescribed shape has the line symmetry with a symmetry axis parallel to the X-axis. The X-axis line symmetry flag 13d set at "0" indicates that the radial gradation in the prescribed shape does not have the line symmetry with a symmetry axis parallel to the X-axis. Incidentally, the X-axis is an axis representing the horizontal direction of the printing area. The positive X-axis (representing the positive X direction) extends rightward from the origin (set at the upper left corner of the printing area).

The X-axis line symmetry flag 13d is set in the radial gradation rasterization process (FIG. 6) or the perfect circular radial gradation rasterization process (FIG. 9) executed by the CPU 11.

In the radial gradation rasterization process, for example, the CPU 11 initializes the X-axis line symmetry flag 13d to "0" and thereafter judges whether or not the prescribed shape (in which the radial gradation is drawn) has the line symmetry with a symmetry axis parallel to the X-axis and the center coordinates of the radial gradation are on the symmetry axis.

If the prescribed shape (in which the radial gradation is drawn) is judged to have the line symmetry with a symmetry axis parallel to the X-axis and the center coordinates of the radial gradation are judged to be on the symmetry axis, the CPU 11 judges that the radial gradation in the prescribed shape has the line symmetry with a symmetry axis parallel to the X-axis, and sets the X-axis line symmetry flag 13*d* at "1".

Meanwhile, in the perfect circular radial gradation rasterization process, the CPU 11 initializes the X-axis line symmetry flag 13*d* to "0" and thereafter judges whether or not the gradation center coordinates after the affine transformation coincide with the center coordinates of the perfect circular shape obtained by the affine transformation (i.e. the origin).

If the gradation center coordinates after the affine transformation are judged to coincide with the center coordinates of the perfect circular shape (origin), the CPU 11 judges that the radial gradation has line symmetry with the X-axis as a symmetry axis (satisfying the line symmetry with a symmetry axis parallel to the X-axis), and thus sets the X-axis line symmetry flag 13*d* at "1".

The Y-axis line symmetry flag 13*e* is a flag indicating whether or not the radial gradation in the prescribed shape has line symmetry with a symmetry axis parallel to the Y-axis. The Y-axis line symmetry flag 13*e* set at "1" indicates that the radial gradation in the prescribed shape has the line symmetry with a symmetry axis parallel to the Y-axis. The Y-axis line symmetry flag 13*e* set at "0" indicates that the radial gradation in the prescribed shape does not have the line symmetry with a symmetry axis parallel to the Y-axis. The Y-axis is an axis representing the vertical direction of the printing area as mentioned above.

The Y-axis line symmetry flag 13*e* is set in the radial gradation rasterization process (FIG. 6) or the perfect circular radial gradation rasterization process (FIG. 9) executed by the CPU 11.

In the radial gradation rasterization process, for example, the CPU 11 initializes the Y-axis line symmetry flag 13*e* to "0" and thereafter judges whether or not the prescribed shape (in which the radial gradation is drawn) has the line symmetry with a symmetry axis parallel to the Y-axis and the center coordinates of the radial gradation are on the symmetry axis.

If the prescribed shape (in which the radial gradation is drawn) is judged to have the line symmetry with a symmetry axis parallel to the Y-axis and the center coordinates of the radial gradation are judged to be on the symmetry axis, the CPU 11 judges that the radial gradation in the prescribed shape has the line symmetry with a symmetry axis parallel to the Y-axis, and sets the Y-axis line symmetry flag 13*e* at "1".

Meanwhile, in the perfect circular radial gradation rasterization process, the CPU 11 unconditionally sets the Y-axis line symmetry flag 13*e* at "1" for the following reason: In the perfect circular radial gradation (the radial gradation in the perfect circular shape (whose center is at the origin) obtained by the affine transformation of the elliptical shape), the gradation center (after the affine transformation) has finally been placed on the nonnegative part of the Y-axis as mentioned above, and thus the perfect circular radial gradation necessarily has line symmetry with the Y-axis (line connecting the center of the perfect circular shape (origin) and the gradation center after the affine transformation) as a symmetry axis (necessarily satisfies the aforementioned line symmetry with a symmetry axis parallel to the Y-axis).

If the gradation center coordinates after the affine transformation are judged to coincide with the center coordinates of the perfect circular shape (origin), the X-axis line symmetry flag 13*d* is also set at "1" as mentioned above. Thus, the CPU 11 can judge that the perfect circular radial gradation has line symmetry with the X and Y axes as symmetry axes.

On the other hand, if the gradation center coordinates after the affine transformation do not coincide with the center coordinates of the perfect circular shape (origin), the X-axis line symmetry flag 13*d* is set at "0". Thus, the CPU 11 can judge that the perfect circular radial gradation has the line symmetry with the Y-axis as a symmetry axis.

The point symmetry flag 13*f* is a flag indicating whether or not the radial gradation in the prescribed shape has point symmetry. The point symmetry flag 13*f* set at "1" indicates that the radial gradation in the prescribed shape has point symmetry. The point symmetry flag 13*f* set at "0" indicates that the radial gradation in the prescribed shape does not have point symmetry The point symmetry flag 13*f* is set in the radial gradation rasterization process (FIG. 6) or the perfect circular radial gradation rasterization process (FIG. 9) executed by the CPU 11.

In the radial gradation rasterization process, for example, the CPU 11 initializes the point symmetry flag 13*f* to "0" and thereafter judges whether or not the prescribed shape (in which the radial gradation is drawn) has point symmetry and the center coordinates of the radial gradation are at the center of the point symmetry (point of symmetry).

If the prescribed shape (in which the radial gradation is drawn) is judged to have point symmetry and the center coordinates of the radial gradation are judged to be at the center of the point symmetry, the CPU 11 judges that the radial gradation in the prescribed shape has point symmetry and sets the point symmetry flag 13*f* at "1".

Meanwhile, in the perfect circular radial gradation rasterization process, the CPU 11 sets the point symmetry flag 13*f* at "0". Even though the perfect circular radial gradation satisfies both the line symmetry with the X and Y axes as symmetry axes and point symmetry in cases where the gradation center coordinates after the affine transformation coincide with the center coordinates of the perfect circular shape obtained by the affine transformation, the point symmetry flag 13*f* is set at "0" even in such cases for simplification of the process.

Therefore, in the drawing of a perfect circular radial gradation having gradation center coordinates coinciding with the center coordinates of the perfect circular shape, the drawing area of the radial gradation is determined in the drawing process using the property of the radial gradation satisfying the line symmetry with the X and Y axes as symmetry axes.

The values of the X-axis line symmetry flag 13*d*, Y-axis line symmetry flag 13*e* and point symmetry flag 13*f* which have been set in the radial gradation rasterization process or the perfect circular radial gradation rasterization process are referred to in the drawing process (FIG. 7).

The CPU 11 executing the drawing process judges the gradation symmetry of the radial gradation in a prescribed shape (target of drawing) based on the values of the X-axis line symmetry flag 13*d*, Y-axis line symmetry flag 13*e* and point symmetry flag 13*f*, and determines the drawing area (for which the gradation should be drawn) depending on the gradation symmetry.

The intermediate data memory 13*g* is memory for temporarily storing the radial gradation in a prescribed shape as the result of the drawing in the drawing process (FIG. 7) in the bitmap format. Thus, the radial gradation in the prescribed shape is temporarily rasterized on the intermediate data memory 13*g*.

In this case, when the drawing area (for which the gradation should be drawn) has been determined in the drawing process according to the symmetry of the radial gradation in the prescribed shape, a (partial) gradation drawn for the determined drawing area is stored (rasterized) in the intermediate data memory 13g.

The radial gradation in the prescribed shape stored in the intermediate data memory 13g is read out by the CPU 11 in the radial gradation rasterization process (FIG. 6) or the elliptical radial gradation rasterization process (FIG. 8) and the result of the process is finally stored in the page memory 13h.

In this case, when a partial radial gradation has been stored in the intermediate data memory 13g in the drawing process according to the symmetry of the gradation, the CPU 11 generates the whole radial gradation from the partial radial gradation (stored in the intermediate data memory 13g) using the gradation symmetry and develops the whole radial gradation on the page memory 13h.

The page memory 13h is memory for storing the image data to be printed by the printer 1 (generated by the printer control unit 10) in the bitmap format. The radial gradation in a prescribed shape generated by the radial gradation rasterization process (FIG. 6) or the elliptical radial gradation rasterization process (FIG. 8) and other image data generated according to the data (e.g. XPS document) are rasterized on the page memory 13h.

When the image data to be printed by the printer 1 has been rasterized on the page memory 13h by the printing process (FIG. 5) according to the data received from the PC 100 together with the print command, the CPU 11 drives the feeding motor driving circuit 17 and the head driver 20 and thereby prints an image corresponding to the image data stored (rasterized) in the page memory 13h on a sheet (e.g. paper).

The operation panel 14 is a user interface including input buttons for letting the user make printer settings, input instructions, etc. The LCD 15 is a display device for displaying a variety of information (menu, operating status of the printer 1, etc.) depending to the user operation on the operation panel 14.

The feeding motor (LF motor) 16 is a stepping motor for feeding a sheet (placed at a prescribed position in/on the printer 1) downstream or upstream in the feeding direction. Driving control of the feeding motor 16 is executed by the feeding motor driving circuit 17 according to instructions from the CPU 11. By the driving of the feeding motor 16, the sheet is fed to the lower surface of the inkjet head 19 (to face the tips of the nozzles).

The inkjet head 19, as a print head having multiple nozzles (unshown) and actuators (unshown), is equipped with four inkjet head units corresponding to four color inks (cyan, magenta, yellow, black). The head driver 20 is a driving circuit for driving the actuators of the inkjet head 19.

The CPU 11 generates multivalued data corresponding to the four color inks (cyan, magenta, yellow, black) based on the image data stored in the page memory 13h and sends the generated multivalued data to the head driver 20 via a gate array (unshown). The head driver 20 generates driving pulses corresponding to the multivalued data supplied from the CPU 11 and applies the driving pulses to the actuators corresponding to the nozzles, by which ink drops are selectively discharged from the nozzles and an image corresponding to the image data stored in the page memory 13h is printed on a sheet.

The interface 21 is a unit for controlling data communication between the printer 1 and the PC 100. The printer 1 receives the print command and the print data specifying the image to be printed (e.g. XPS document) from the PC 100 via the interface 21.

Upon reception of a print command (with print data) from the PC 100, the interface 21 sends an interrupt signal (for reporting the reception of the print command) to the CPU 11 while transferring the received print data to the print data memory 13a in the RAM 13 by means of DMA (Direct Memory Access).

In the following, the details of the RadialGradientBrush element included in an XPS document will be explained referring to FIGS. 2A and 2B. FIG. 2A is a schematic diagram showing an example of the RadialGradientBrush element and parameters specified by the element. FIG. 2B is a schematic diagram showing an example of an elliptical radial gradation which is drawn according to the parameters specified by the RadialGradientBrush element.

As shown in FIG. 2A, the RadialGradientBrush element is made up of a plurality of attributes and sub-elements. Among the attributes and sub-elements, a "Center" attribute 31, a "RadiusX" attribute 33 and a "RadiusY" attribute 34 give the elliptical shape parameters (specifying an elliptical shape). Meanwhile, a "GradientOrigin" attribute 32 and a RadialGradientBrush.GradientStops element 35 give the gradation pattern parameters (specifying a gradation pattern to be drawn in the elliptical shape).

The "Center" attribute 31 specifies the coordinates (Cx, Cy) of the center of the elliptical shape shown in FIG. 2B. Here, the "center of the elliptical shape" means a point where the major axis and the minor axis of the elliptical shape intersect with each other.

The "GradientOrigin" attribute 32 specifies the coordinates (Gx, Gy) of the center of the radial gradation shown in FIG. 2B (i.e. the gradation center coordinates). Here, the "center of the radial gradation" means a point where the color variation in the radial gradation starts (i.e. starting point of the gradation).

The radial gradation is expressed so that its color gradually changes from its center to points on the periphery of the elliptical shape specified by the RadialGradientBrush element (as endpoints of the color variation in the gradation (endpoints of the gradation)).

Incidentally, the parameters given by the "Center" attribute 31 and the "GradientOrigin" attribute 32 are described in terms of an orthogonal coordinate system represented by the aforementioned two coordinate axes (X-axis and Y-axis) (see FIG. 2B).

In the example of the RadialGradientBrush element shown in FIG. 2A, the center coordinates of the elliptical shape are specified as (150, 150) by the "Center" attribute 31, while the center coordinates of the radial gradation is specified as (200, 170) by the "GradientOrigin" attribute 32.

Meanwhile, the "RadiusX" attribute 33 specifies the radius Rx of the elliptical shape in the X-axis direction (hereinafter referred to as an "X-radius"), and the "RadiusY" attribute 34 specifies the radius Ry of the elliptical shape in the Y-axis direction (hereinafter referred to as a "Y-radius").

Incidentally, the major/minor axes of the elliptical shape (specified by the parameters of the "RadiusX" attribute 33 and the "RadiusY" attribute 34) are set in the X-axis direction and Y-axis direction.

Therefore, the smaller of Rx or Ry represents the minor axis radius of the elliptical shape, while the larger of Rx or Ry represents the major axis radius of the elliptical shape. As shown in FIG. 2B, the lengths of the elliptical shape in the X-axis direction and Y-axis direction are 2Rx and 2Ry, respectively.

In the example of the RadialGradientBrush element shown in FIG. 2A, the X-radius is specified as "140" by the "RadiusX" attribute 33, and the Y-radius is specified as "100" by the "RadiusY" attribute 34.

Meanwhile, the RadialGradientBrush.GradientStops element 35 gives parameters specifying color values of the gradation. The element 35 includes two sub-elements: GradientStop elements 35a and 35b. Each GradientStop element (35a, 35b) includes a "Color" attribute and an "Offset" attribute.

The "Color" attribute specifies color values of red, green and blue at the point specified by the "Offset" attribute. In the "Color" attribute, the color values are described as a six-digit hexadecimal number, in which the most significant two digits specify the red color value (Rs or Re), the next two digits specify the green color value (Gs or Ge), and the least significant two digits specify the blue color value (Bs or Be).

The "Offset" attribute specifies the point having the color values specified by the "Color" attribute. For example, when the value of the "Offset" attribute is "0", it means that the color values specified by the "Color" attribute are those at the center (starting point) of the radial gradation. When the value of the "Offset" attribute is "1", it means that the color values specified by the "Color" attribute are those at the points on the periphery of the elliptical shape specified by the RadialGradientBrush element (i.e. at the endpoints of the gradation).

Therefore, the color values (Rs, Gs, Bs) of red, green and blue at the center (starting point) of the radial gradation (see FIG. 2B) are specified by the GradientStop element 35a, while the color values (Re, Ge, Be) of red, green and blue at the points on the periphery of the elliptical shape (i.e. at the endpoints of the gradation) (see FIG. 2B) are specified by the GradientStop element 35b.

In the example of the RadialGradientBrush element shown in FIG. 2A, the red/green/blue color values (Rs, Gs, Bs) at the center (starting point) of the radial gradation are specified as $(FF)_{16}$, $(FF)_{16}$ and $(00)_{16}$ by the GradientStop element 35a.

Meanwhile, the red/green/blue color values (Re, Ge, Be) at the points on the periphery of the elliptical shape (i.e. at the endpoints of the gradation) are specified as $(00)_{16}$, $(00)_{16}$ and $(FF)_{16}$ by the GradientStop element 35b. Incidentally, the value "$(FF)_{16}$" represents "FF" in the hexadecimal notation ("255" in the decimal notation) and the value "$(00)_{16}$" represents "00" in the hexadecimal notation ("0" in the decimal notation).

With the RadialGradientBrush element including such attributes and sub-elements, the drawing position of the elliptical shape in the printing area is determined from (specified by) the center coordinates (Cx, Cy) of the elliptical shape given by the "Center" attribute 31, and the shape and size of the periphery of the elliptical shape are determined from (specified by) the X-radius and the Y-radius of the elliptical shape given by the "RadiusX" attribute 33 and the "RadiusY" attribute 34, as shown in FIG. 2B. From the above information, the positions of the points on the periphery of the elliptical shape in the printing area are determined.

Meanwhile, the position of the center of the radial gradation in the printing area is determined (specified) by the gradation center coordinates (Gx, Gy) given by the "GradientOrigin" attribute 32.

The gradation pattern in the elliptical shape is determined by interpolation by use of the red/green/blue color values (Rs, Gs, Bs) at the center (starting point) of the radial gradation specified by the GradientStop element 35a and the red/green/blue color values (Re, Ge, Be) at the points on the periphery of the elliptical shape (i.e. at the endpoints of the gradation) specified by the GradientStop element 35b, depending on the distance between the center of the radial gradation and each point on the periphery of the elliptical shape.

In the following, the principles for the drawing of the elliptical radial gradation employed in this embodiment will be explained referring to FIGS. 3A-3E. FIGS. 3A-3E are schematic diagrams for explaining the principles for the drawing of the elliptical radial gradation. In the following explanation, the 3×3 matrix shown below will be expressed as (a, b, c, d, e, f).

$$(a, b, c, d, e, f) = \begin{pmatrix} a & b & 0 \\ c & d & 0 \\ e & f & 1 \end{pmatrix}$$

In this embodiment, when the data received from the PC 100 together with a print command is an XPS document and the XPS document includes a RadialGradientBrush element, the printer control unit 10 (CPU 11) first extracts the parameters shown in FIG. 3A, that is, the elliptical shape parameters specifying an elliptical shape (i.e. the center coordinates (Cx, Cy), the X-radius Rx and the Y-radius Ry of the elliptical shape) and the parameters specifying a gradation pattern to be drawn in the elliptical shape (i.e. the center coordinates (Gx, Gy) of the radial gradation, the color values (Rs, Gs, Bs) at the center (starting point) of the radial gradation and the color values (Re, Ge, Be) at the periphery of the elliptical shape (endpoints of the gradation)), from the RadialGradientBrush element (S1 in FIG. 3A).

Incidentally, FIG. 3A is a schematic diagram (almost identical with FIG. 2B) showing an example of an elliptical radial gradation which is drawn according to the parameters specified by the RadialGradientBrush element.

Subsequently, the CPU 11 generates a transformation matrix A for affine transforming the elliptical shape shown in FIG. 3A into the perfect circular shape shown in FIG. 3B (whose radius is Rx and whose center coordinates are (0, 0)) by use of the extracted elliptical shape parameters, according to the following equation (1) (S2 in FIG. 3B):

$$A = (1, 0, 0, Rx/Ry, -Cx, -(Rx/Ry) \cdot Cy) \quad (1)$$

Incidentally, while a case where the elliptical shape shown in FIG. 3A is affine transformed into the perfect circular shape shown in FIG. 3B (having a radius Rx and center coordinates (0, 0)) is explained in this embodiment, the elliptical shape shown in FIG. 3A may also be affine transformed into a perfect circular shape having a radius Ry and center coordinates (0, 0), or into a perfect circular shape having a radius R (arbitrary value) and center coordinates (0, 0). In the former case, the transformation matrix A is generated according to the following equation (2). In the latter case, the transformation matrix A is generated according to the following equation (3).

$$A = (Ry/Rx, 0, 0, 1, -(Ry/Rx) \cdot Cx, -Cy) \quad (2)$$

$$A = (R/Rx, 0, 0, R/Ry, -(R/Rx) \cdot Cx, -(R/Ry) \cdot Cy) \quad (3)$$

Subsequently, the CPU 11 affine transforms the gradation center coordinates (Gx, Gy) shown in FIG. 3A using the transformation matrix A generated by the equation (1) (S3 in FIG. 3B). Then, the CPU 11 judges whether the center of the radial gradation after the affine transformation (see FIG. 3B) is on the nonnegative part of the Y-axis or not. If the gradation center after the affine transformation is not on the nonnegative part of the Y-axis, the CPU 11 calculates an angle θ between the positive Y-axis and a line segment connecting the origin (0, 0) and the gradation center (see FIG. 3B) (S4 in FIG. 3B).

Subsequently, the CPU 11 generates a transformation matrix B1 for rotation around the origin by the angle θ (affine transformation) according to the following equation (4), and then generates a transformation matrix B (i.e. the transformation matrix A to which a rotational element has been added) by multiplying the transformation matrix A by the transformation matrix B1 as shown in the following equation (5) (S5 in FIG. 3C).

$$B1 = (\cos \theta, \sin \theta, -\sin \theta, \cos \theta, 0, 0) \quad (4)$$

$$B = A \cdot B1 \quad (5)$$

On the other hand, if the gradation center after the affine transformation using the transformation matrix A generated by the equation (1) is on the nonnegative part of the Y-axis, the transformation matrix A of the equation (1) is directly used as the transformation matrix B.

Subsequently, the CPU 11 affine transforms the gradation center coordinates (Gx, Gy) shown in FIG. 3A again by use of the transformation matrix B, by which the elliptical shape shown in FIG. 3A is transformed into a perfect circular shape having a radius Rx and center coordinates (0, 0) and the gradation center is placed on the nonnegative part of the Y-axis as shown in FIG. 3C.

Subsequently, the CPU 11 executes a rasterization process for drawing a radial gradation for (in) the perfect circular shape shown in FIG. 3C (S6 in FIG. 3C). Specifically, the CPU 11 generates a radial gradation shown in FIG. 3D so that the red/green/blue color values in the gradation gradually change from the values (Rs, Gs, Bs) at the starting point of the gradation (i.e. the gradation center after the affine transformation placed on the nonnegative part of the Y-axis) to the values (Re, Ge, Be) at the endpoints of the gradation (i.e. the periphery of the perfect circular shape). The rasterization process is completed by storing the generated radial gradation in the perfect circular shape (perfect circular radial gradation) in the intermediate data memory 13g in the bitmap format. The method of generating the perfect circular radial gradation will be explained later with reference to FIG. 4.

In the rasterization, the CPU 11 previously judges the gradation symmetry of the perfect circular radial gradation based on the judgment on whether the gradation center (after the affine transformation) in the perfect circular radial gradation is at the center of the perfect circular shape (origin) or not, and determines an area to be rasterized (rasterization area) depending on the gradation symmetry.

For example, when the gradation center (after the affine transformation) in the perfect circular radial gradation is judged not to be at the center of the perfect circular shape (origin), the CPU 11 (judging that the perfect circular radial gradation has the line symmetry with the Y-axis as a symmetry axis) determines a semicircular area surrounded by the Y-axis and the periphery of the perfect circular shape (on the positive X side, for example) as the rasterization area (for which the perfect circular radial gradation is rasterized) and then executes the rasterization for the determined rasterization area (see FIG. 3D). Incidentally, while the semicircular area on the positive X side is determined as the rasterization area in this example, it is also possible to determine the other semicircular area (on the negative X side) as the rasterization area.

On the other hand, when the gradation center (after the affine transformation) in the perfect circular radial gradation is judged to be at the center of the perfect circular shape (origin), the CPU 11 (judging that the perfect circular radial gradation has the line symmetry with the X and Y axes as symmetry axes) determines a ¼ fan-shaped area in the perfect circular shape (on the positive X side and on the negative Y side, for example) as the rasterization area and then executes the rasterization for the determined rasterization area.

Incidentally, while the fan-shaped area on the positive X side and on the negative Y side is determined as the rasterization area in this example, it is also possible to determine a different fan-shaped area (on the positive X side and on the positive Y side, on the negative X side and on the negative Y side, or on the negative X side and on the positive Y side) as the rasterization area.

Subsequently, to the perfect circular shape in which the gradation shown in FIG. 3D (stored in the intermediate data memory 13g) has been drawn, the CPU 11 executes the inverse affine transformation (S7 in FIG. 3D). The inverse affine transformation is executed using a transformation matrix as the inverse of the transformation matrix B (used for the affine transformation of the elliptical shape shown in FIG. 3A into the perfect circular shape shown in FIG. 3C (in which the gradation has been drawn at this point)). Therefore, the elliptical radial gradation shown in FIG. 3E can be generated from the perfect circular radial gradation shown in FIG. 3D.

The elliptical radial gradation generated as above is stored in the page memory 13h in the bitmap format, by which the rasterization of the elliptical radial gradation is completed.

In this case, when a radial gradation rasterized for a semicircular area or a ¼ fan-shaped area according to the gradation symmetry (partial radial gradation) has been stored in the intermediate data memory 13g, the CPU 11 determines the whole radial gradation from the partial radial gradation stored in the intermediate data memory 13g using the gradation symmetry and thereafter executes the inverse affine transformation, by which the whole area of the elliptical radial gradation is developed on the page memory 13h as shown in FIG. 3E.

As above, the elliptical radial gradation specified by the RadialGradientBrush element can be generated by drawing a gradation in the perfect circular shape obtained by the affine transformation of the elliptical shape (specified by the RadialGradientBrush element) by the transformation matrix B and then executing the inverse affine transformation to the perfect circular shape (in which the gradation has been drawn) by the inverse matrix of the transformation matrix B.

Figure 4:
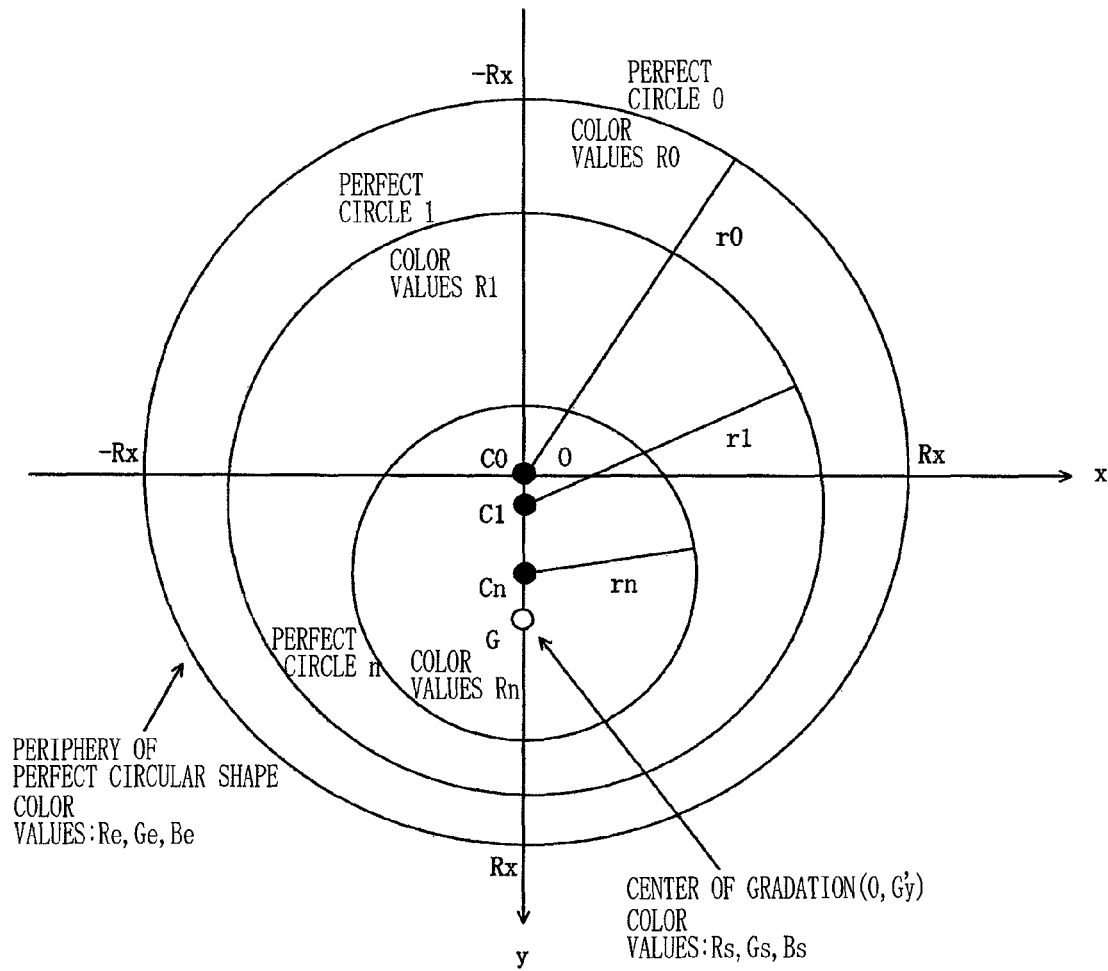
FIG. 4 is a schematic diagram for explaining a method of generating a red radial gradation for a perfect circular radial gradation.

Next, the method of generating the perfect circular radial gradation (radial gradation in a perfect circular shape) will be explained referring to FIG. 4. FIG. 4 is a schematic diagram for explaining a method of generating a red radial gradation for the perfect circular radial gradation. For generating the perfect circular radial gradation, radial gradations of red, green and blue are generated independently. The methods of generating the green radial gradation and the blue radial gradation are identical with the method of generating the red radial gradation (explained here), and thus illustration and explanation thereof are omitted for brevity.

A perfect circular radial gradation (of red, green or blue) is generated by successively calculating the center coordinates and the radius of each perfect circle having a uniform color value and successively drawing each perfect circle (specified by the center coordinates and the radius) with the uniform color value, from the periphery of the perfect circular shape.

Specifically, the CPU 11 (printer control unit 10) first determines the center coordinates C0 and the radius r0 of the periphery of the perfect circular shape (perfect circle 0) as (0, 0) and Rx, respectively. Subsequently, the CPU 11 sets a (red) color value R0 for the points on the perfect circle 0 (specified by the center coordinates C0 and the radius r0) and the inside of the perfect circle 0 at the color value Re for the periphery of the perfect circular shape (endpoints of the gradation), and then draws the points on the perfect circle 0 and the inside of the perfect circle 0 with the color value R0 (—Re).

Incidentally, the drawing of the points on the perfect circle 0 and the inside of the perfect circle 0 in this embodiment is executed for the semicircular area or ¼ fan-shaped area which has been determined according to the gradation symmetry in the drawing process (FIG. 7) as mentioned above.

Subsequently, the CPU 11 calculates center coordinates C1 (C1x, C1y), a radius r1 and a color value R1 of an inner perfect circle 1 (which is immediately inside the perfect circle 0 and for which the color value R1 different from the color value R0 of the perfect circle 0 is used) by use of the following equations (6)-(9):

$$C1x=0 \quad (6)$$

$$C1y=G'y \cdot k/(Re-Rs) \quad (7)$$

$$r1=r0-r0 \cdot k/(Re-Rs) \quad (8)$$

$$R1=Re-k \quad (9)$$

where "G'y" denotes the Y coordinate of the gradation center after the affine transformation by the transformation matrix B, and "k" denotes the variation (difference) in the color value between two adjacent perfect circles (two adjacent annular areas).

In this embodiment, the color value variation k is set at a negative value (e.g. −1) when the color value Rs at the gradation center is larger than the color value Re at the periphery of the perfect circular shape, or at a positive value (e.g. +1) when the color value Rs at the gradation center is smaller than the color value Re at the periphery of the perfect circular shape. Incidentally, the absolute value of the color value variation k may be set properly so that the color variation in the gradation looks smooth, in consideration of the human sense, characteristics of the color space being used, color reproduction performance of the printer 1, etc.

Subsequently, the CPU 11 draws an area inside the perfect circle 1 (specified by the center coordinates C1 (C1x, C1y) and the radius r1 calculated by the equations (6)-(8)) and inside the semicircular area or ¼ fan-shaped area (determined according to the gradation symmetry in the drawing process) with the color value R1 calculated by the equation (9).

Thereafter, the CPU 11 successively calculates the center coordinates, the radius and the color value of each subsequent (inner) perfect circle (2, 3, . . . , n, . . . ) from outside, while successively drawing each corresponding area (inside the perfect circle (2, 3, . . . , n, . . . ) specified by the calculated center coordinates and radius and inside the semicircular area or ¼ fan-shaped area determined according to the gradation symmetry in the drawing process) with the calculated color value. The process is repeated until the drawing of a perfect circle drawn with the color value Rs is completed. Incidentally, the center coordinates Cn (Cnx, Cny), the radius rn and the color value Rn of each perfect circle n are calculated by use of the following equations (10)-(13):

$$Cnx=0 \quad (10)$$

$$Cny=G'y \cdot n \cdot k/(Re-Rs) \quad (11)$$

$$rn=r0-r0 \cdot n \cdot k/(Re-Rs) \quad (12)$$

$$Rn=Re-n \cdot k \quad (13)$$

The perfect circular radial gradation (radial gradation in the perfect circular shape) is generated by the method described above. In this method, the gradation center has been placed on the nonnegative part of the Y-axis by the affine transformation using the transformation matrix B, and thus the X coordinate can be fixed at "0" in the calculation of the center coordinates of each perfect circle having a uniform color value.

In other words, the center coordinates of each perfect circle to be drawn with a uniform color value can be calculated as a one-dimensional function (using the Y coordinate only), by which the number of calculations necessary for the drawing of the radial gradation in the perfect circular shape can be reduced considerably.

Further, by the placement of the gradation center on the nonnegative part of the Y-axis by the affine transformation by the transformation matrix B, the gradation center after the affine transformation can be fixed at the center of the perfect circular shape or at a position on the positive side of the center of the perfect circular shape.

In the following, the process flow of the printing process executed by the printer control unit 10 (CPU 11) will be described referring to FIG. 5. FIG. 5 is a flow chart of the printing process. The printing process, for generating the image data to be printed by the printer 1 based on the print data received (following the print command) from the PC 100 via the interface 21 and printing out the generated image data, is started when the interrupt signal (sent from the interface 21 for informing the CPU 11 of the reception of the print command) is detected by the CPU 11.

At the start of the printing process, the CPU 11 (printer control unit 10) judges whether the print data received from the PC 100 following the print command is an XPS document (document described according to XPS) or not (S11). When the print data is an XPS document (S11: YES), the CPU 11 reads out the XPS document (which has been transferred from the interface 21 to the print data memory 13*a* by means of DMA (Direct Memory Access)) from the print data memory 13*a*, analyzes the contents of the XPS document, and acquires one element included in the XPS document (S12).

Subsequently, the CPU 11 judges whether the element acquired in S12 is a RadialGradientBrush element or not (S13). When the acquired element is a RadialGradientBrush element (S13: YES), the CPU 11 (judging that the acquired element is an instruction for drawing an elliptical radial gradation) executes the elliptical radial gradation rasterization process (FIG. 8) which will be explained later (S14).

By the elliptical radial gradation rasterization process, the elliptical radial gradation specified by the RadialGradientBrush element can be generated while reducing the load related to the drawing of the elliptical radial gradation. The generated elliptical radial gradation is rasterized on the page memory 13*h*. After the step S14, the process advances to step S16.

On the other hand, when the element acquired in S12 is not a RadialGradientBrush element (S13: NO), the CPU 11 executes a rasterization process corresponding to the acquired element, stores image data generated by the rasterization process in the page memory 13*h* (S15), and advances to the step S16.

In the step S16, the CPU 11 judges whether the XPS document still includes an element that has not been extracted (acquired) in S12 yet. When the XPS document includes an element yet to be extracted (S16: YES), the CPU 11 returns to the step S12 to repeat the steps S12-S16 for the next element.

The steps S12-S16 are repeated until all the elements included in the XPS document are extracted in S12 and the rasterization process (S14 or S15) is completed for all the elements (S16: NO), by which the whole of the image data specified by the XPS document is rasterized on the page memory 13h.

In this case where all the elements included in the XPS document have been extracted in S12 and the rasterization process (S14 or S15) has been completed for all the elements (S16: NO), the process advances to step S20.

Meanwhile, when the print data received from the PC 100 following the print command is not an XPS document in S11 (S11: NO), the CPU 11 reads out the print data stored in the print data memory 13a and judges whether the print data includes an image drawing instruction ordering the drawing of a radial gradation in a prescribed shape (S17).

When the print data includes an image drawing instruction ordering the drawing of a radial gradation in a prescribed shape (S17: YES), the CPU 11 executes the radial gradation rasterization process (FIG. 6) which will be explained later (S18).

By the radial gradation rasterization process, the radial gradation in the prescribed shape specified by the image drawing instruction can be generated while reducing the load related to the drawing of the radial gradation. The generated radial gradation in the prescribed shape is rasterized on the page memory 13h. After the step S18, the process advances to step S19.

On the other hand, when the print data does not include an image drawing instruction ordering the drawing of a radial gradation in a prescribed shape in S17 (S17: NO), the CPU 11 advances to the step S19 while skipping the step S18.

In the step S19, the CPU 11 generates image data (for printing) according to the print data stored in the print data memory 13a (except each image drawing instruction ordering the drawing of a radial gradation in a prescribed shape) and stores the generated image data in the page memory 13h. Thereafter, the process advances to the step S20.

In the step S20, the CPU 11 sends signals to the feeding motor driving circuit 17 and the head driver 20 based on the image data generated in S11-S19 and stored in the page memory 13h, by which the feeding motor 16 and the inkjet head 19 are driven and an image according to the image data is printed on a sheet (completion of the printing process of FIG. 5).

By the printing process (FIG. 5) explained above, upon reception of a print command from the PC 100, image data can be generated based on the print data following the print command, and an image according to the generated image data can be printed on a sheet.

In the printing process, when an XPS document is received from the PC 100 as the print data following the print command, the XPS document is analyzed. When a RadialGradientBrush element is included in the XPS document, the elliptical radial gradation rasterization process (explained later) is executed, by which the printer control unit 10 is allowed to generate the elliptical radial gradation specified by the RadialGradientBrush element while reducing the load related to the drawing of the elliptical radial gradation.

When data that is not an XPS document is received from the PC 100 as the print data following the print command and the print data includes an image drawing instruction ordering the drawing of a radial gradation in a prescribed shape, the radial gradation rasterization process (explained below) is executed, by which the printer control unit 10 is allowed to generate the radial gradation in the prescribed shape specified by the image drawing instruction while reducing the load related to the drawing of the radial gradation.

Next, the radial gradation rasterization process, which is executed by the printer control unit 10 (CPU 11) as the step S18 in FIG. 5, will be explained referring to FIG. 6. FIG. 6 is a flow chart of the radial gradation rasterization process. This process, for generating a radial gradation in a prescribed shape according to an image drawing instruction (included in print data that is not an XPS document) ordering the drawing of the radial gradation in the prescribed shape, is executed by the CPU 11 in the printing process when the print data following the print command is not an XPS document and the print data includes an image drawing instruction ordering the drawing of a radial gradation in a prescribed shape.

At the start of the radial gradation rasterization process, the CPU 11 (printer control unit 10) acquires information on the shape of the radial gradation (included in the parameters specifying the gradation pattern) from the image drawing instruction ordering the drawing of the radial gradation in the prescribed shape and stores the acquired information in the gradation parameter memory 13b (S21).

The CPU 11 also acquires the center coordinates of the radial gradation (included in the parameters specifying the gradation pattern) from the image drawing instruction and stores the acquired gradation center coordinates also in the gradation parameter memory 13b (S22).

The parameters acquired in S21 and S22 are used in subsequent steps for judging the symmetry of the radial gradation in the prescribed shape specified by the image drawing instruction.

Subsequently, the CPU 11 initializes the X-axis line symmetry flag 13d, the Y-axis line symmetry flag 13e and the point symmetry flag 13f to "0" (S23). In the subsequent steps (S24-S29), the CPU 1 judges the symmetry of the radial gradation (in the prescribed shape) to be drawn, and when the radial gradation satisfies certain symmetry, the CPU 11 sets each flag corresponding to the symmetry at "1".

Specifically, the CPU 11 first judges whether or not the shape of the radial gradation has the line symmetry with a symmetry axis parallel to the X-axis (i.e. line symmetry with a symmetry axis in the X-axis direction) and the gradation center coordinates are on the line symmetry axis based on the information on the shape and the gradation center coordinates stored in the gradation parameter memory 13b (S24).

If affirmative (S24: YES), the CPU 11 sets the X-axis line symmetry flag 13d at "1" (S25) and advances to step S26.

By the X-axis line symmetry flag 13d set at "1", the CPU 11 in subsequent steps is allowed to recognize that the radial gradation specified by the image drawing instruction has the line symmetry with a symmetry axis parallel to the X-axis.

On the other hand, when the shape does not have the line symmetry with a symmetry axis parallel to the X-axis or when the shape has the line symmetry (with a symmetry axis parallel to the X-axis) but the gradation center coordinates are not on the line symmetry axis (S24: NO), the CPU 11 advances to the step S26 while skipping the step S25.

In this case, the X-axis line symmetry flag 13d remains at "0", by which the CPU 11 in subsequent steps is allowed to recognize that the radial gradation specified by the image drawing instruction does not have the line symmetry with a symmetry axis parallel to the X-axis.

In the step S26, the CPU 11 judges whether or not the shape has the line symmetry with a symmetry axis parallel to the Y-axis (i.e. line symmetry with a symmetry axis in the Y-axis direction) and the gradation center coordinates are on the line symmetry axis based on the information on the shape and the gradation center coordinates stored in the gradation parameter memory 13b.

If affirmative (S26: YES), the CPU 11 sets the Y-axis line symmetry flag 13e at "1" (S27) and advances to step S28.

By the Y-axis line symmetry flag 13e set at "1", the CPU 11 in subsequent steps is allowed to recognize that the radial gradation specified by the image drawing instruction has the line symmetry with a symmetry axis parallel to the Y-axis.

On the other hand, when the shape does not have the line symmetry with a symmetry axis parallel to the Y-axis or when the shape has the line symmetry (with a symmetry axis parallel to the Y-axis) but the gradation center coordinates are not on the line symmetry axis (S26: NO), the CPU 11 advances to the step S28 while skipping the step S27.

In this case, the Y-axis line symmetry flag 13e remains at "0", by which the CPU 11 in subsequent steps is allowed to recognize that the radial gradation specified by the image drawing instruction does not have the line symmetry with a symmetry axis parallel to the Y-axis.

In the step S28, the CPU 11 judges whether or not the shape has point symmetry and the center of the radial gradation is at the center of the point symmetry based on the information on the shape and the gradation center coordinates stored in the gradation parameter memory 13b.

If affirmative (S28: YES), the CPU 11 sets the point symmetry flag 13f at "1" (S29) and advances to step S30. By the point symmetry flag 13f set at "1", the CPU 11 in subsequent steps is allowed to recognize that the radial gradation specified by the image drawing instruction has point symmetry.

On the other hand, when the shape does not have point symmetry or when the shape has point symmetry but the center of the radial gradation is not at the center of the point symmetry (S28: NO), the CPU 11 advances to the step S30 while skipping the step S29.

In this case, the point symmetry flag 13f remains at "0", by which the CPU 11 in subsequent steps is allowed to recognize that the radial gradation specified by the image drawing instruction does not have point symmetry.

As above, the symmetry of the radial gradation in the prescribed shape specified by the image drawing instruction is judged and the result of the judgment is stored in the X-axis line symmetry flag 13d, the Y-axis line symmetry flag 13e and the point symmetry flag 13f in the steps S24-S29.

In the step S30, the CPU 11 executes the drawing process which will be explained later. In the drawing process, when the radial gradation in the prescribed shape satisfies certain gradation symmetry based on the result of the gradation symmetry judgment (S24-S29), a partial area of the gradation usable for generating the whole area of the gradation is determined using the gradation symmetry, and the radial gradation in the prescribed shape is drawn for the determined area and temporarily rasterized on the intermediate data memory 13g (explained later).

After finishing the drawing process (S30), the CPU 11 reads out the radial gradation in the prescribed shape temporarily rasterized on the intermediate data memory 13g and finally rasterizes (the whole area of) the radial gradation on the page memory 13h (S31), by which the radial gradation rasterization process (FIG. 6) is completed.

In the step S31, when a partial area of the radial gradation in the prescribed shape (partial radial gradation) has been rasterized on the intermediate data memory 13g according to the gradation symmetry, the CPU 11 develops the partial radial gradation (rasterized on the intermediate data memory 13g) into the whole area of the radial gradation using the gradation symmetry and thereby rasterizes the whole of the radial gradation on the page memory 13h, by which the whole area of the radial gradation in the prescribed shape specified by the image drawing instruction can be rasterized on the page memory 13h. Incidentally, the development of the partial radial gradation into the whole area of the radial gradation using the gradation symmetry is executed by means of coordinate transformation with respect to the X-axis, the Y-axis or the center of the point symmetry.

Next, the drawing process executed by the printer control unit 10 (CPU 11) will be explained referring to FIG. 7. FIG. 7 is a flow chart of the drawing process. This process, for drawing a radial gradation in a prescribed shape (e.g. perfect circular shape obtained by the affine transformation of an elliptical shape), is executed by the CPU 11 in the radial gradation rasterization process (FIG. 6, explained above) or in the perfect circular radial gradation rasterization process (FIG. 9, explained later).

At the start of the drawing process, the CPU 11 (printer control unit 10) judges whether the value of the X-axis line symmetry flag 13d is "1" or not (S41). If affirmative (S41: YES), the CPU 11 judges whether the value of the Y-axis line symmetry flag 13e is "1" or not (S42).

If affirmative in S42 (S42: YES), the radial gradation (in the prescribed shape) to be drawn can be judged to have the line symmetry with a symmetry axis parallel to the X-axis and the line symmetry with a symmetry axis parallel to the Y-axis.

In this case, once the radial gradation has been drawn for one of four areas obtained by partitioning the whole radial gradation drawing area (for which the radial gradation should be drawn finally) with the symmetry axes in the X and Y directions, the whole area of the radial gradation can be generated from the drawn gradation using the gradation symmetry. Thus, the CPU 11 in this case determines one of the four areas (obtained by the partitioning with the symmetry axes in the X and Y directions) as the drawing area (S43) and thereafter advances to step S50.

On the other hand, when the value of the Y-axis line symmetry flag 13e is "0" (not "1") in S42 (S42: NO), the radial gradation (in the prescribed shape) to be drawn can be judged not to have the line symmetry with a symmetry axis parallel to the Y-axis but to have the line symmetry with a symmetry axis parallel to the X-axis.

In this case, once the radial gradation has been drawn for one of two areas obtained by partitioning the whole radial gradation drawing area with the symmetry axis in the X-axis direction, the whole area of the radial gradation can be generated from the drawn gradation using the gradation symmetry. Thus, the CPU 11 in this case determines one of the two areas (obtained by the partitioning with the symmetry axis in the X-axis direction) as the drawing area (S44) and thereafter advances to the step S50.

Meanwhile, when the value of the X-axis line symmetry flag 13d is "0" (not "1") in S41 (S41: NO), the CPU 11 judges whether the value of the Y-axis line symmetry flag 13e is "1" or not (S45).

If affirmative in S45 (S45: YES), the radial gradation (in the prescribed shape) to be drawn can be judged not to have the line symmetry with a symmetry axis parallel to the X-axis but to have the line symmetry with a symmetry axis parallel to the Y-axis.

In this case, once the radial gradation has been drawn for one of two areas obtained by partitioning the whole radial gradation drawing area with the symmetry axis in the Y-axis direction, the whole area of the radial gradation can be generated from the drawn gradation using the gradation symmetry. Thus, the CPU 11 in this case determines one of the two areas (obtained by the partitioning with the symmetry axis in the Y-axis direction) as the drawing area (S46) and thereafter advances to the step S50.

On the other hand, when the value of the Y-axis line symmetry flag 13e is "0" (not "1") in S45 (845: NO), the radial gradation (in the prescribed shape) to be drawn can be judged to have neither the line symmetry with a symmetry axis parallel to the X-axis nor the line symmetry with a symmetry axis parallel to the Y-axis.

Thus, the CPU 11 in this case judges whether the value of the point symmetry flag 13f is "1" or not (S47). If affirmative in S47 (S47: YES), the radial gradation (in the prescribed shape) to be drawn can be judged to have point symmetry.

In this case, once the radial gradation has been drawn for one of two areas obtained by partitioning the whole radial gradation drawing area with an arbitrary line crossing the center of the point symmetry, the whole area of the radial gradation can be generated from the drawn gradation using the gradation symmetry. Thus, the CPU 11 in this case determines one of two areas obtained by the partitioning the whole radial gradation drawing area with a line in the X-axis direction crossing the center of the point symmetry as the drawing area (S48) and thereafter advances to the step S50.

Incidentally, the CPU 11 in the step S48 may also determine one of two areas obtained by the partitioning the whole radial gradation drawing area with a line in the Y-axis direction crossing the center of the point symmetry (or one of two areas obtained by partitioning the whole radial gradation drawing area with an arbitrary line crossing the center of the point symmetry) as the drawing area.

On the other hand, when the value of the point symmetry flag 13f is "0" (not "1") in S47 (S47: NO), the radial gradation (in the prescribed shape) to be drawn can at least be judged to have none of the line symmetry with a symmetry axis parallel to the X-axis, the line symmetry with a symmetry axis parallel to the Y-axis or point symmetry. Thus, the CPU 11 in this case determines the whole radial gradation drawing area as the drawing area (S49) and thereafter advances to the step S50.

In the step S50, the CPU 11 draws the radial gradation in the prescribed shape for the drawing area determined in S41-S49 according to the gradation pattern parameters stored in the gradation parameter memory 13b, by which the drawing process (FIG. 7) is completed.

As above, when the radial gradation (in a prescribed shape) to be drawn satisfies certain symmetry, a partial area of the gradation usable for generating the whole area of the gradation is determined using the gradation symmetry, and the radial gradation is drawn for the determined area. Thus, the load related to the drawing can be reduced compared to cases where the gradation is drawn throughout the whole area. By using the symmetry of the gradation, the whole area of the radial gradation can be generated from the drawn gradation with ease. Consequently, a radial gradation in a prescribed shape can be generated while reducing the load related to the drawing of the radial gradation.

Figure 8:
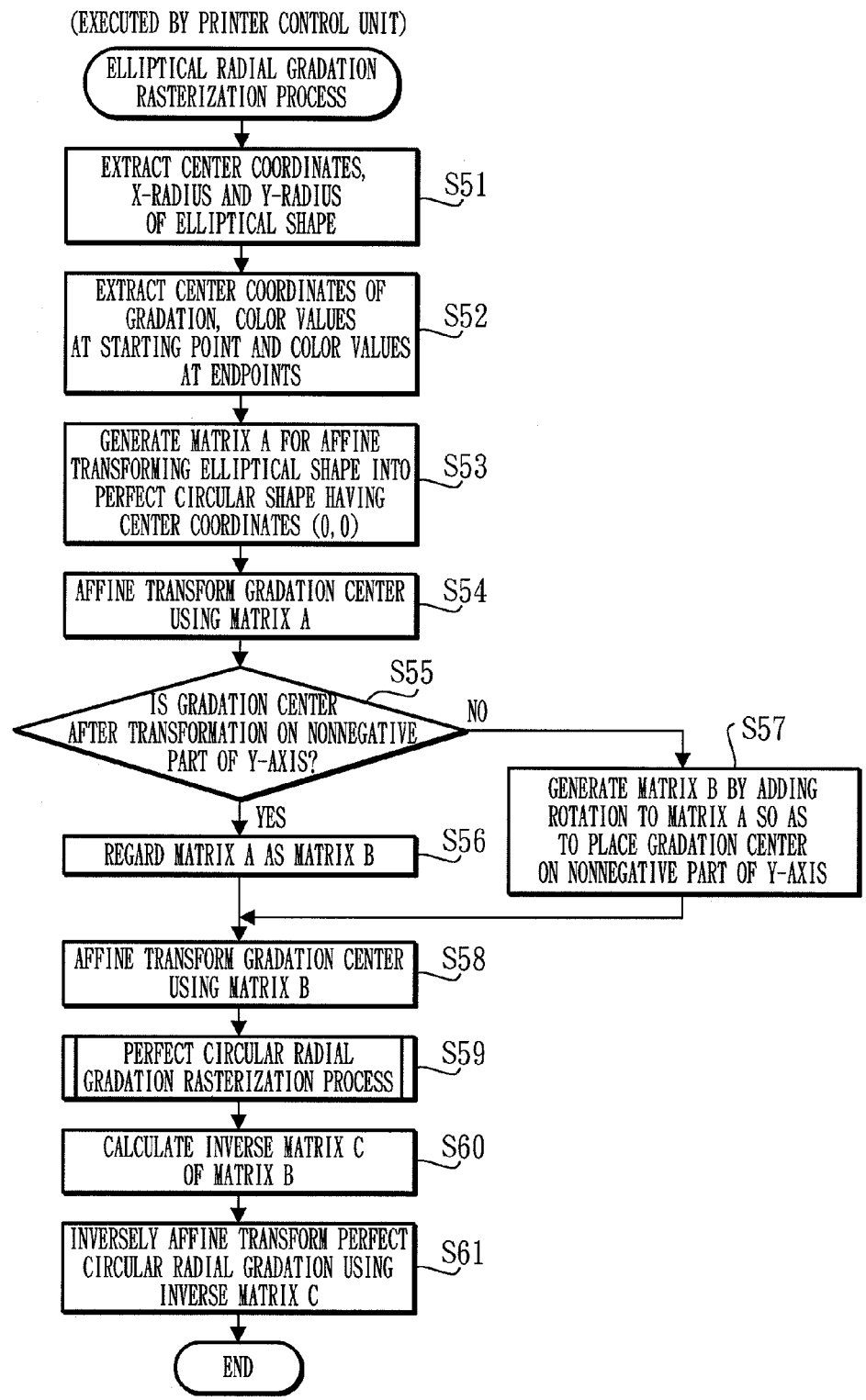
FIG. 8 is a flow chart of an elliptical radial gradation rasterization process which is executed by the printer control unit.

Next, the elliptical radial gradation rasterization process, which is executed by the printer control unit 10 (CPU 11) as the step S14 in FIG. 5, will be explained referring to FIG. 8. FIG. 8 is a flow chart of the elliptical radial gradation rasterization process.

The elliptical radial gradation rasterization process, for generating an elliptical radial gradation specified by a RadialGradientBrush element included in an XPS document, is executed when the data following the print command is an XPS document and a RadialGradientBrush element is included in the elements described in the XPS document in the printing process (FIG. 5) executed by the CPU 11. The elliptical radial gradation rasterization process (FIG. 8) will be explained below while associating it with the aforementioned principles for the drawing of the elliptical radial gradation shown in FIGS. 3A-3E.

At the start of the elliptical radial gradation rasterization process, the CPU 11 (printer control unit 10) extracts the center coordinates (Cx, Cy), the X-radius Rx and the Y-radius Ry of the elliptical shape (see FIGS. 2A and 2B) from the RadialGradientBrush element as the elliptical shape parameters (specifying an elliptical shape) and stores the extracted parameters in the gradation parameter memory 13b (S51).

Subsequently, the CPU 11 extracts the center coordinates (Gx, Gy) of the radial gradation, the red/green/blue color values (Rs, Gs, Bs) at the center (starting point) of the radial gradation and the red/green/blue color values (Re, Ge, Be) at the periphery of the elliptical shape (endpoints of the gradation) (see FIGS. 2A and 2B) from the RadialGradientBrush element as the parameters specifying a gradation pattern to be drawn in the elliptical shape and stores the extracted parameters in the gradation parameter memory 13b (S52). These steps S51 and S52 correspond to the step S1 shown in FIG. 3A.

Subsequently, the CPU 11 reads out the elliptical shape parameters stored in the gradation parameter memory 13b, generates the transformation matrix A for the affine transformation from the elliptical shape specified by the RadialGradientBrush element (see FIG. 3A) into the perfect circular shape having the radius Rx and center coordinates (0, 0) (see FIG. 3B) by use of the equation (1), and stores the generated transformation matrix A in the transformation matrix memory 13c (S53). This step S53 corresponds to the step S2 shown in FIG. 3B.

Incidentally, the step S53 may be configured to generate a different transformation matrix A by use of the equation (2) and store the generated transformation matrix A in the transformation matrix memory 13c so as to affine transform the elliptical shape into a perfect circular shape having the radius Ry and center coordinates (0, 0), as mentioned above. The step S53 may also be configured to generate a different transformation matrix A by use of the equation (3) and store the generated transformation matrix A in the transformation matrix memory 13c so as to affine transform the elliptical shape into a perfect circular shape having a radius R (arbitrary value) and center coordinates (0, 0), as mentioned above.

After generating the transformation matrix A and storing it in the transformation matrix memory 13c (S53), the CPU 11 affine transforms the gradation center coordinates (Gx, Gy) stored in the gradation parameter memory 13b using the transformation matrix A stored in the transformation matrix memory 13c (S54). This step S54 corresponds to the step S3 shown in FIG. 3B.

Subsequently, the CPU 11 judges whether the gradation center coordinates obtained by the affine transformation of S54 are on the nonnegative part of the Y-axis or not (S55). When the gradation center coordinates after the affine transformation are on the nonnegative part of the Y-axis (S55: YES), the CPU 11 keeps the transformation matrix A stored in the transformation matrix memory 13c in order to use the transformation matrix A directly as the transformation matrix B (S56). Thereafter, the process advances to step S58.

On the other hand, when the gradation center coordinates after the affine transformation are not on the nonnegative part of the Y-axis (S55: NO), the CPU 11 calculates the angle θ between the positive Y-axis and the line segment connecting the origin (0, 0) and the gradation center after the affine transformation (see FIG. 3B) (step S4 shown in FIG. 3B), generates the transformation matrix B by adding the rotational operation around the origin (0, 0) by the angle θ (i.e. the aforementioned rotational element) to the transformation matrix A stored in the transformation matrix memory 13c by use of the equations (4) and (5) (step S5 shown in FIG. 3C), and stores the generated transformation matrix B in the transformation matrix memory 13c by overwriting the transformation matrix A (S57). Thereafter, the process advances to the step S58.

By executing the steps S55-S57 as above, the transformation matrix B, for affine transforming the elliptical shape specified by the RadialGradientBrush element (see FIG. 3A) into the perfect circular shape having the radius Rx and center coordinates (0, 0) and placing the gradation center on the nonnegative part of the Y-axis (see FIG. 3C), can be generated.

In the step S58, the CPU 11 affine transforms the gradation center coordinates (Gx, Gy) stored in the gradation parameter memory 13b by using the transformation matrix B this time and stores the affine transformed gradation center coordinates in the gradation parameter memory 13b, by which the center of the radial gradation is placed on the nonnegative part of the Y-axis.

In the step S58, the radius Rx and center coordinates (0, 0) of the perfect circular shape obtained by the affine transformation of the elliptical shape using the transformation matrix B are also stored in the gradation parameter memory 13b. These parameters are referred to in the perfect circular radial gradation rasterization process (explained later) for generating the perfect circular radial gradation.

Subsequently, the CPU 11 executes the perfect circular radial gradation rasterization process (FIG. 9) which will be explained later (S59), by which a radial gradation can be drawn for (in) the perfect circular shape shown in FIG. 3C (with the radius Rx and center coordinates (0, 0)) while reducing the load related to the drawing of the gradation. In the perfect circular radial gradation rasterization process, a ¼ fan-shaped area or semicircular area in the perfect circular shape is determined as the drawing area based on the symmetry of the perfect circular radial gradation, and the perfect circular radial gradation is drawn for the drawing area and stored in the intermediate data memory 13g in the bitmap format (rasterization). This step S59 corresponds to the step S6 shown in FIG. 3C.

After finishing S59, the CPU 11 calculates an inverse matrix C of the transformation matrix B which has been kept or stored in the transformation matrix memory 13c in S56 or S57 (S60). By use of the inverse matrix C, the CPU 11 inversely affine transforms the perfect circular radial gradation stored in the intermediate data memory 13g in S59, stores the result of the inverse affine transformation in the page memory 13h in the bitmap format (S61), and ends the elliptical radial gradation rasterization process of FIG. 8.

In the step S61, in cases where the perfect circular radial gradation has been rasterized on the intermediate data memory 13g for a ¼ fan-shaped area or semicircular area according to the gradation symmetry, the CPU 11 determines (generates) the whole area of the perfect circular radial gradation from the radial gradation stored in the intermediate data memory 13g using the gradation symmetry and thereafter executes the inverse affine transformation, by which the whole area of the elliptical radial gradation is developed on the page memory 13h as shown in FIG. 3E.

By the step S61, the elliptical radial gradation specified by the RadialGradientBrush element can be generated and rasterized on the page memory 13h as shown in FIG. 3E. This step S61 corresponds to the step S7 shown in FIG. 3D.

As above, in the elliptical radial gradation rasterization process executed by the printer control unit 10 (CPU 11), the gradation is first drawn in a perfect circular shape without directly drawing the specified gradation in the elliptical shape, by which each boundary line between annular areas drawn with different color values can be calculated based on the locus of a perfect circle. Since the calculation can be simplified compared to the case where the gradation is drawn directly for the elliptical shape, the load related to the drawing of the gradation can be reduced considerably.

Further, since the inverse matrix C of the transformation matrix B (generated based on the elliptical shape parameters to transform the elliptical shape into the perfect circular shape) is calculated and the perfect circular shape in which the gradation has been drawn is inversely affine transformed using the inverse matrix C, the radial gradation according to the elliptical shape and the gradation pattern specified by the RadialGradientBrush element can be generated with ease.

Thus, in cases where there exists a RadialGradientBrush element in a document described according to XPS, an elliptical radial gradation specified by the RadialGradientBrush element can be generated while reducing the load related to the drawing of the gradation.

Furthermore, since the center of the radial gradation after the affine transformation is placed on the Y-axis, the center positions (center coordinates) of the perfect circles (in each of which a uniform color value is used for the drawing) are calculated along the Y-axis and the gradation is drawn for the perfect circles. With this method, the center positions of the perfect circles (in each of which a uniform color value is used for the drawing) can be calculated by using a one-dimensional function represented by the Y coordinate of the center position. Therefore, the number of calculations necessary for the drawing of the gradation in the perfect circular shape can be reduced further, and consequently, the load related to the drawing of the radial gradation can be reduced further.

Next, the perfect circular radial gradation rasterization process, which is executed by the printer control unit 10 (CPU 11) as the step S59 in FIG. 8, will be explained referring to FIG. 9. FIG. 9 is a flow chart of the perfect circular radial gradation rasterization process. This process, for generating a radial gradation (perfect circular radial gradation) in the perfect circular shape obtained by the affine transformation of the elliptical shape, is executed by the CPU 11 in the elliptical radial gradation rasterization process.

At the start of the perfect circular radial gradation rasterization process, the CPU 11 (printer control unit 10) acquires information on the perfect circular shape (obtained by the affine transformation of the elliptical shape using the transformation matrix B calculated in the elliptical radial gradation rasterization process (FIG. 8)) from the gradation parameter memory 13b (S71).

The information on the perfect circular shape includes the center coordinates of the perfect circular shape. The center coordinates acquired from the gradation parameter memory 13b are (0, 0) since the affine transformation of the elliptical shape has been executed in the elliptical radial gradation rasterization process so as to set the center coordinates of the perfect circular shape at (0, 0).

Subsequently, the CPU 11 acquires the gradation center coordinates after the affine transformation by the transformation matrix B in the elliptical radial gradation rasterization process (FIG. 8) from the gradation parameter memory 13b (S72).

The parameters acquired in S71 and S72 are used in subsequent steps for judging the gradation symmetry of the perfect circular radial gradation.

Subsequently, the CPU 11 initializes the X-axis line symmetry flag 13d and the point symmetry flag 13f to "0", sets the Y-axis line symmetry flag 13e at "1" (S73), and specifies the Y-axis as the line symmetry axis in the Y-axis direction (S74).

Among the three flags 13d-13f set at prescribed values in S73, the X-axis line symmetry flag 13d is switched (or kept at 0) depending on the symmetry of the perfect circular radial gradation in steps S75-S77 explained later. The Y-axis line symmetry flag 13e is kept at "1".

As mentioned above, the perfect circular radial gradation (radial gradation in the perfect circular shape (whose center is at the origin) obtained by the affine transformation of the elliptical shape by the transformation matrix B) necessarily satisfies the line symmetry with the Y-axis as a symmetry axis since the gradation center (after the affine transformation) of the perfect circular radial gradation has finally been placed on the nonnegative part of the Y-axis.

For this reason, the Y-axis line symmetry flag 13e is set at "1" in S73 and the Y-axis is specified as the line symmetry axis in the Y-axis direction in S74, by which the CPU 11 in subsequent steps is allowed to recognize that the perfect circular radial gradation has the line symmetry with the Y-axis as a symmetry axis.

In the next step S75, the CPU 11 judges whether the gradation center coordinates after the affine transformation acquired in S72 coincide with the center coordinates (0, 0) of the perfect circular shape acquired in S71 or not in order to judge whether the perfect circular radial gradation has the line symmetry with the X-axis as a symmetry axis.

When the gradation center coordinates after the affine transformation coincide with the center coordinates (0, 0) of the perfect circular shape (S75: YES), the perfect circular radial gradation necessarily satisfies both the line symmetry with the X-axis as a symmetry axis and the line symmetry with the Y-axis as a symmetry axis.

Thus, the CPU 11 in this case sets the X-axis line symmetry flag 13d at "1" (S76), specifies the X-axis as the line symmetry axis in the X-axis direction (S77), and thereafter advances to step S78. In this case (S73, S74, S76 and S77), the CPU 11 in subsequent steps is allowed to recognize that the perfect circular radial gradation has both the line symmetry with the X-axis as a symmetry axis and the line symmetry with the Y-axis as a symmetry axis.

On the other hand, when the gradation center coordinates after the affine transformation do not coincide with the center coordinates (0, 0) of the perfect circular shape (S75: NO), the CPU 11 advances to the step S78 while skipping the steps S76 and S77, by which the X-axis line symmetry flag 13d is kept at "0" and the CPU 11 in subsequent steps is allowed to recognize that the perfect circular radial gradation does not have the line symmetry with the X-axis as a symmetry axis but has the line symmetry with the Y-axis as a symmetry axis.

In the step S78, the CPU 11 executes the drawing process (FIG. 7) explained above, by which the drawing area (for which the perfect circular radial gradation should be drawn) is determined based on the result of the gradation symmetry judgment (S73-S77) and the perfect circular radial gradation is drawn for the determined drawing area and temporarily rasterized on the intermediate data memory 13g.

Specifically, in the case where both the X-axis line symmetry flag 13d and the Y-axis line symmetry flag 13e are "1", a ¼ fan-shaped area obtained by partitioning the perfect circular shape with the X-axis and the Y-axis is determined as the drawing area, and the perfect circular radial gradation is drawn for the ¼ fan-shaped area and rasterized on the intermediate data memory 13g.

Since the gradation is drawn just for the ¼ fan-shaped area in the perfect circular shape as above, the load related to the drawing can be reduced. The whole area of the perfect circular radial gradation can be determined (generated) from the drawn area just by simple turnback (symmetrical copying) operations since the drawn area (drawing area) is a ¼ fan-shaped area.

On the other hand, in the case where the X-axis line symmetry flag 13d is "0" and the Y-axis line symmetry flag 13e is "1", a semicircular area obtained by partitioning the perfect circular shape with the Y-axis is determined as the drawing area, and the perfect circular radial gradation is drawn for the semicircular area and rasterized on the intermediate data memory 13g.

Since the semicircular area obtained by partitioning the perfect circular shape with the Y-axis is determined as the drawing area as above, minimum gradation drawing (for the minimum area (semicircular area) necessary for drawing (generating) the whole area of the gradation) can be realized in this case, by which the load related to the drawing can be reduced.

When the drawing process (S78) is finished, the CPU 11 ends the perfect circular radial gradation rasterization process of FIG. 9. Thereafter, in the elliptical radial gradation rasterization process (FIG. 8), the whole area of the perfect circular radial gradation is determined (generated) from the radial gradation stored in the intermediate data memory 13g using the gradation symmetry, and then the whole area of the elliptical radial gradation is generated by the inverse affine transformation and rasterized on the page memory 13h.

As above, in the perfect circular radial gradation rasterization process executed by the printer control unit 10 (CPU 11), the perfect circular radial gradation is unconditionally judged to have the line symmetry with the Y-axis as a symmetry axis (since the line symmetry with the Y-axis as a symmetry axis is necessarily satisfied for the aforementioned reason), by which the CPU 11 is allowed to make the judgment on the gradation symmetry with a simple method.

Whether the perfect circular radial gradation has the line symmetry with the X-axis as a symmetry axis or not is judged based on the positional relationship between the center of the radial gradation and the center of the perfect circular shape, and the drawing area is determined based exclusively on the judgment. Thus, the drawing area can be determined easily and correctly based on the positional relationship between the gradation center and the center of the perfect circular shape.

As described above, by the printer control unit 10 of the printer 1 in accordance with this embodiment, when the radial gradation (in a prescribed shape) to be generated satisfies certain symmetry, a partial area of the radial gradation usable for generating the whole area of the radial gradation is determined using the gradation symmetry, and the radial gradation is drawn for the determined area. Thus, the load related to the drawing can be reduced compared to cases where the gradation is drawn throughout the whole area. By using the symmetry of the gradation, the whole area of the radial gradation can be generated from the drawn gradation with ease. Consequently, a radial gradation in a prescribed shape can be generated while reducing the load related to the drawing of the radial gradation.

Further, when an image drawing instruction ordering the drawing of an elliptical radial gradation (radial gradation in an elliptical shape) is inputted, the printer control unit 10 of this embodiment generates the transformation matrix for the affine transformation from the elliptical shape into the perfect circular shape. Thus, the judgment on the gradation symmetry can be made for the perfect circular radial gradation (radial gradation in the perfect circular shape obtained by the affine transformation), without making the judgment for the elliptical radial gradation.

Since certain gradation symmetry is necessarily satisfied in the case where the shape of the gradation is a perfect circular shape as explained above, the judgment on the gradation symmetry can be made with a simple method. Further, since any elliptical radial gradation (in any elliptical shape) can be transformed to satisfy certain gradation symmetry by executing the transformation into a perfect circular shape, the load related to the drawing can necessarily be reduced by determining the drawing area (in the perfect circular shape) using the gradation symmetry.

Further, with the printer 1 in accordance with this embodiment, when print data received from the PC 100 following a print command includes an instruction for drawing a radial gradation in a prescribed shape, the radial gradation in the prescribed shape is generated based on the drawing instruction by the above printer control unit 10. Therefore, the printing of a radial gradation in a prescribed shape can be carried out by generating the radial gradation while reducing the load related to the drawing of the radial gradation.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the major axis and minor axis of the elliptical shape specified by the RadialGradientBrush element (image drawing instruction) of the XPS document are set in the X-axis direction and Y-axis direction in the above embodiment, the major axis and minor axis of the elliptical shape may be set in arbitrary directions.

In this case, it is possible to first execute rotational affine transformation to the elliptical shape specified by the image drawing instruction so as to set its major axis and minor axis in the X-axis direction and Y-axis direction, generate the elliptical radial gradation according to the drawing principles explained referring to FIGS. 3A-3E, and finally execute inverse rotational affine transformation to the obtained elliptical radial gradation to return the major axis and minor axis of the (rotated) elliptical shape to the original directions specified by the image drawing instruction.

While the color values at the center (starting point) of the gradation and the color values at the periphery of the elliptical shape (endpoints of the gradation) are specified by the RadialGradientBrush.GradientStops element included in the RadialGradientBrush element in the above embodiment, the above embodiment is applicable also to cases where the RadialGradientBrush.GradientStops element further includes a GradientStop element which specifies color values at an arbitrary point between the starting point and endpoint of the gradation.

In this case, a value represented by an "Offset" attribute of the GradientStop element specifying the color values at the arbitrary point indicates a (relative) distance d between the starting point of the gradation and the arbitrary point for which the color values are specified by the GradientStop element (when the distance between the starting point and an endpoint of the gradation situated on a line extending from the starting point and crossing the arbitrary point is normalized to "1"). Therefore, the drawing of the gradation for (in) the perfect circular shape can be executed by setting color values of corresponding points (that are the (relative) distance d away from the center (starting point) of the perfect circular gradation) at the color values of the arbitrary point specified by the GradientStop element.

While the inverse matrix C of the transformation matrix B is calculated after generating the radial gradation for the perfect circular shape in the elliptical radial gradation rasterization process (FIG. 8) in the above embodiment, the timing of the inverse matrix calculation is not restricted to that in the above embodiment; the inverse matrix C may be calculated at any time after the generation of the transformation matrix B and before the inverse affine transformation of the perfect circular shape in which the radial gradation has been drawn.

While the elliptical radial gradation rasterization process (FIG. 8) is executed when (on condition that) print data received from the PC 100 following a print command is an XPS document and a RadialGradientBrush element (as an instruction for drawing an elliptical radial gradation) is included in the XPS document in the above embodiment, the condition for executing the elliptical radial gradation rasterization process is not restricted to that in the embodiment. The elliptical radial gradation rasterization process (FIG. 8) may be executed at any time when an instruction for drawing an elliptical radial gradation is included in PDL data (data described in a PDL (Page Description Language)) received from the PC 100 following a print command.

The printer control unit 10 may also be configured to generate an elliptical radial gradation upon input of an image drawing instruction (ordering the drawing of the elliptical radial gradation) not by executing the elliptical radial gradation rasterization process (FIG. 8) but by executing the radial gradation rasterization process (FIG. 6).

While the printer control unit 10 in the above embodiment generates a perfect circular radial gradation by executing the radial gradation rasterization process (FIG. 6) when an instruction for drawing a perfect circular radial gradation is included in print data (received from the PC 100 following a print command) that is not an XPS document, the printer control unit 10 may also be configured to generate the perfect circular radial gradation by first executing affine transformation (for moving the center of the perfect circular shape to the origin and placing the center of the radial gradation on the nonnegative part of the Y-axis) to the perfect circular shape and then executing the perfect circular radial gradation rasterization process (FIG. 9). In this case, the perfect circular radial gradation specified by the drawing instruction can be obtained by inversely affine transforming the perfect circular radial gradation drawn (generated) as above.

While the drawing area is determined as a ¼ fan-shaped area in the perfect circular shape in the case where the center of a perfect circular radial gradation to be drawn is at the center of the perfect circular shape in the above embodiment, the drawing area in this case may also be set as an arbitrary fan-shaped area at least containing pixels on a line segment connecting the center and the periphery of the perfect circular shape, since the perfect circular radial gradation actually has line symmetry with an infinite number of symmetry axes crossing the center of the perfect circular shape. Also with this method, the whole area of the perfect circular radial gradation can be obtained.

While the judgment on the symmetry of a radial gradation in a prescribed shape to be drawn is made by judging whether the radial gradation in the prescribed shape satisfies each of the three types of symmetry (line symmetry with a symmetry axis parallel to the X-axis, line symmetry with a symmetry axis parallel to the Y-axis, point symmetry) in the above embodiment, the symmetry judgment may be made differently. For example, the printer control unit 10 may be configured to judge at least one of the three types of symmetry, or to make the symmetry judgment by judging whether the radial gradation in the prescribed shape satisfies line symmetry with an arbitrary line as a symmetry axis.

While the printer control unit 10 is provided inside the printer 1 in the above embodiment, the printer control unit 10 may be provided outside the printer 1 and connected to the printer 1 via a communication cable or wireless communication. The printer control unit 10 may also be provided inside the PC 100.

While the radial gradation rasterization process (FIG. 6) or the elliptical radial gradation rasterization process (FIG. 8) is executed by the printer control unit 10 to generate a radial gradation in a prescribed shape to be printed by the printer 1 in the above embodiment, these processes may be executed not only by such a printer control unit but also by any unit/device that controls a device for outputting a radial gradation in a prescribed shape. For example, in cases where a display is used for displaying a radial gradation in a prescribed shape, a display control unit for controlling the display may execute the radial gradation rasterization process (FIG. 6) or the elliptical radial gradation rasterization process (FIG. 8) and rasterize the radial gradation in the prescribed shape generated by the process on a frame memory for storing image data to be displayed on the display.

While the printer 1 in the above embodiment prints an image (e.g. radial gradation in a prescribed shape) on a sheet (e.g. paper) as a print medium, the printer 1 may also be configured to execute the printing on other types of print media (fabric, plastic, vinyl, etc.).

While the transformation matrix B in the elliptical radial gradation rasterization process (FIG. 8) is generated so as to place the center of the gradation after the affine transformation on the nonnegative part of the Y-axis in the above embodiment, the transformation matrix B may also be generated so as to place the gradation center (after the affine transformation) on the nonpositive part of the Y-axis. It is also possible to generate the transformation matrix B so as to place the gradation center (after the affine transformation) on the nonnegative part of the X-axis or on the nonpositive part of the X-axis.

Figure 10:
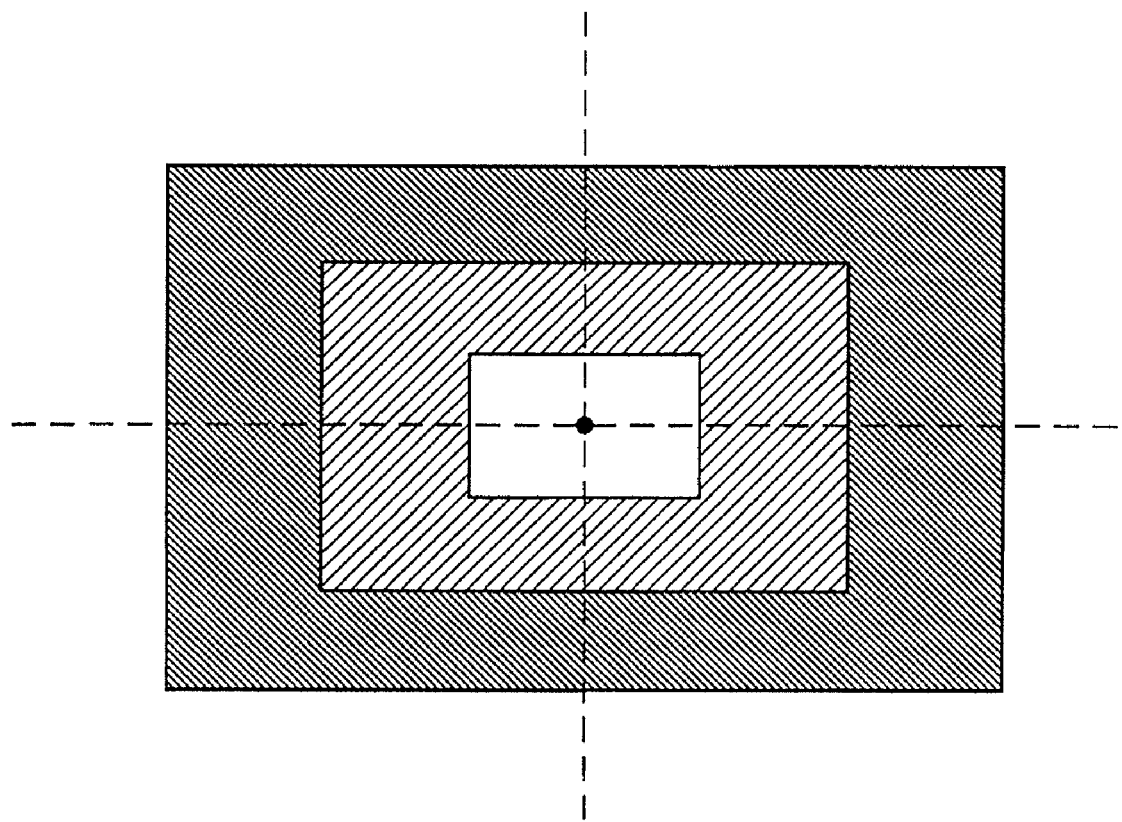
FIG. 10 is a schematic diagram showing another example of a gradation in which the color value changes from the center of the gradation through multiple areas in a prescribed shape.

While a perfect circle (perfect circular shape) has been used in the above embodiment as an example of the shape of a gradation having symmetry, gradations in other shapes (e.g. rectangular gradation shown in FIG. 10) may also be processed (generated) by the printer control unit 10 as a gradation having symmetry. In such cases, the printer control unit 10 executing the radial gradation rasterization process (FIG. 6) acquires information on the shape of the gradation (e.g. rectangle shown in FIG. 10) and the center coordinates of the gradation (see S21 and S22 in FIG. 6) and thereafter executes the subsequent steps.

What is claimed is:

1. An image generating device for generating an image including a gradation in which a color changes from a center of the gradation through multiple areas, comprising:
    an acquisition unit that acquires parameters representing a gradation pattern, the parameters specifying the center of the gradation and a shape of the gradation;
    a symmetry judgment unit that judges whether or not a gradation symmetry is satisfied, wherein the gradation symmetry is judged to be satisfied in the case where the shape of the gradation specified by the parameters has line symmetry or point symmetry and the center of the gradation is on a symmetry axis of the line symmetry or at the center of the point symmetry;
    an area determination unit that determines a partial area usable for generating a whole area of the gradation by use of the gradation symmetry, if the gradation symmetry is judged to be satisfied;
    a drawing unit that draws the gradation in the partial area based on the parameters acquired by the acquisition unit; and
    a gradation development unit that develops the gradation drawn in the partial area into the whole area of the gradation using the gradation symmetry by drawing the gradation drawn in the partial area repeatedly in the whole area.

2. The image generating device according to claim 1, wherein the symmetry judgment unit judges that the gradation symmetry is satisfied if the shape of the gradation specified by the parameters is a perfect circular shape.

3. The image generating device according to claim 1, further comprising a center judgment unit that judges whether or not the center of the gradation is at the center of a perfect circular shape if the shape of the gradation specified by the parameters is the perfect circular shape,
    wherein the area determination unit determines, as the partial area, a fan-shaped area that is one quarter of the perfect circular shape, if the gradation symmetry is judged to be satisfied by the symmetry judgment unit since the shape of the gradation is a perfect circular shape and if the center of the gradation is judged to be at the center of the perfect circular shape by the center judgment unit.

4. The image generating device according to claim 3, wherein the area determination unit determines, as the partial area, a semicircular area surrounded by a periphery of the perfect circular shape and a line, the line connecting the center of the gradation and the center of the perfect circular shape, if the gradation symmetry is judged to be satisfied by the symmetry judgment unit since the shape of the gradation is a perfect circular shape and if the center of the gradation is judged not to be at the center of the perfect circular shape by the center judgment unit.

5. The image generating device according to claim 1, further comprising:
    an accepting unit that accepts a drawing instruction instructing the drawing of an elliptical radial gradation;
    an extraction unit that extracts parameters representing a gradation pattern, the parameters specifying an elliptical shape and the center of the elliptical radial gradation, from the accepted drawing instruction;
    a transformation matrix generating unit that generates a transformation matrix for transforming the elliptical shape into a perfect circular shape based on the parameters specifying the elliptical shape; and
    a transformation unit that transforms the parameters specifying the center of the elliptical radial gradation using the transformation matrix,
    wherein the acquisition unit acquires parameters specifying the perfect circular shape obtained by the transformation of the elliptical shape using the transformation matrix as the parameters specifying the shape of the gradation while acquiring the parameters specifying the center of the elliptical radial gradation after being transformed by the transformation unit as the parameters specifying the center of the gradation.

6. A printing device comprising an image generating unit that generates an image including a gradation in which a color changes from a center of the gradation through multiple areas and a printing unit that prints the image generated by the image generating unit on a print medium, wherein the image generating unit includes:
    an acquisition unit that acquires parameters representing a gradation pattern, the parameters specifying the center of the gradation and a shape of the gradation;
    a symmetry judgment unit that judges whether or not a gradation symmetry is satisfied, wherein the gradation symmetry is judged to be satisfied in the case where the shape of the gradation specified by the parameters has line symmetry or point symmetry, and the center of the gradation is on a symmetry axis of the line symmetry or at the center of the point symmetry;

an area determination unit that determines a partial area usable for generating a whole area of the gradation by use of the gradation symmetry, if the gradation symmetry is judged to be satisfied;

a drawing unit that draws the gradation in the partial area based on the parameters acquired by the acquisition unit; and a gradation development unit that develops the gradation drawn in the partial area into the whole area of the gradation using the gradation symmetry by drawing the gradation drawn in the partial area repeatedly in the whole area.

7. The printing device according to claim 6, wherein the symmetry judgment unit judges that the gradation symmetry is satisfied if the shape of the gradation specified by the parameters is a perfect circular shape.

8. The printing device according to claim 6, wherein:
the image generating unit further includes a center judgment unit that judges whether or not the center of the gradation is at the center of a perfect circular shape if the shape of the gradation specified by the parameters is the perfect circular shape, and
the area determination unit determines, as the partial area, a fan-shaped area that is one quarter of the perfect circular shape, if the gradation symmetry is judged to be satisfied by the symmetry judgment unit since the shape of the gradation is a perfect circular shape and if the center of the gradation is judged to be at the center of the perfect circular shape by the center judgment unit.

9. The printing device according to claim 8, wherein the area determination unit determines, as the partial area, a semicircular area surrounded by a periphery of the perfect circular shape and a line, the line connecting the center of the gradation and the center of the perfect circular shape, if the gradation symmetry is judged to be satisfied by the symmetry judgment unit since the shape of the gradation is a perfect circular shape and if the center of the gradation is judged not to be at the center of the perfect circular shape by the center judgment unit.

10. The printing device according to claim 6, wherein the image generating unit further includes:
an accepting unit that accepts a drawing instruction instructing the drawing of an elliptical radial gradation;
an extraction unit that extracts parameters representing a gradation pattern, the parameters specifying an elliptical shape and the center of the elliptical radial gradation, from the accepted drawing instruction;
a transformation matrix generating unit that generates a transformation matrix for transforming the elliptical shape into a perfect circular shape based on the parameters specifying the elliptical shape; and
a transformation unit that transforms the parameters specifying the center of the elliptical radial gradation using the transformation matrix,
wherein the acquisition unit acquires parameters specifying the perfect circular shape obtained by the transformation of the elliptical shape using the transformation matrix as the parameters specifying the shape of the gradation while acquiring the parameters specifying the center of the elliptical radial gradation after being transformed by the transformation unit as the parameters specifying the center of the gradation.

11. An image generating method for generating an image including a gradation in which a color changes from the center of a gradation through multiple areas, comprising:
an acquisition step of acquiring parameters representing a gradation pattern, the parameters specifying the center of the gradation and a shape of the gradation;
a symmetry judgment step of judging whether or not the gradation symmetry is satisfied, wherein the gradation symmetry is judged to be satisfied in the case where the shape of the gradation specified by the parameters has line symmetry or point symmetry, and the center of the gradation is on a symmetry axis of the line symmetry or at the center of the point symmetry;
an area determination step of determining a partial area usable for generating a whole area of the gradation by use of the gradation symmetry if the gradation symmetry is judged to be satisfied;
a drawing step of drawing the gradation in the partial area based on the parameters acquired by the acquisition step; and
a gradation development step of developing the gradation drawn in the partial area into the whole area of the gradation using the gradation symmetry by drawing the gradation drawn in the partial area repeatedly in the whole area.

12. The image generating method according to claim 11, wherein the symmetry judgment step judges that the gradation symmetry is satisfied if the shape of the gradation specified by the parameters is a perfect circular shape.

13. The image generating method according to claim 11, further comprising a center judgment step of judging whether or not the center of the gradation is at the center of a perfect circular shape if the shape of the gradation specified by the parameters is the perfect circular shape,
wherein the area determination step determines, as the partial area, a fan-shaped area that is one quarter of the perfect circular shape, if the gradation symmetry is judged to be satisfied by the symmetry judgment step since the shape of the gradation is a perfect circular shape and if the center of the gradation is judged to be at the center of the perfect circular shape by the center judgment step.

14. The image generating method according to claim 13, wherein the area determination step determines, as the partial area, a semicircular area surrounded by a periphery of the perfect circular shape and a line, the line connecting the center of the gradation and the center of the perfect circular shape, if the gradation symmetry is judged to be satisfied by the symmetry judgment step since the shape of the gradation is a perfect circular shape and if the center of the gradation is judged not to be at the center of the perfect circular shape by the center judgment step.

15. The image generating method according to claim 11, further comprising:
an accepting step of accepting a drawing instruction instructing the drawing of an elliptical radial gradation;
an extraction step of extracting parameters representing a gradation pattern, the parameters specifying an elliptical shape and the center of the elliptical radial gradation, from the accepted drawing instruction;
a transformation matrix generating step of generating a transformation matrix for transforming the elliptical shape into a perfect circular shape based on the parameters specifying the elliptical shape; and
a transformation step of transforming the parameters specifying the center of the elliptical radial gradation using the transformation matrix, wherein the acquisition step acquires parameters specifying the perfect circular shape obtained by the transformation of the elliptical shape using the transformation matrix as the parameters specifying the shape of the gradation while acquiring the parameters specifying the center of the elliptical radial gradation after being transformed by the transformation step as the parameters specifying the center of the gradation.

16. The image generating device according to claim 5, further comprising:
   an inverse transformation matrix generating unit that generates an inverse transformation matrix of the transformation matrix generated by the transformation matrix generating unit; and
   an inverse transformation unit that inversely transforms the perfect circular shape to the elliptical shape using the inverse transformation matrix.

17. The printing device according to claim 10, wherein the image generating unit further includes:
   an inverse transformation matrix generating unit that generates an inverse transformation matrix of the transformation matrix generated by the transformation matrix generating unit; and
   an inverse transformation unit that inversely transforms the perfect circular shape to the elliptical shape using the inverse transformation matrix.

18. The image generating method according to claim 15, further comprising:
   an inverse transformation matrix generating step of generating an inverse transformation matrix of the transformation matrix generated during the transformation matrix generating step; and
   an inverse transformation step of inversely transforming the perfect circular shape to the elliptical shape using the inverse transformation matrix.

19. The image generating device according to claim 1, further comprising a center judgment unit that judges whether or not the center of the gradation is at the center of a perfect circular shape if the shape of the gradation specified by the parameters is the perfect circular shape,
   wherein the area determination unit determines, as the partial area, a semicircular area surrounded by a periphery of the perfect circular shape and a line, the line connecting the center of the gradation and the center of the perfect circular shape, if the gradation symmetry is judged to be satisfied by the symmetry judgment unit since the shape of the gradation is a perfect circular shape and if the center of the gradation is judged not to be at the center of the perfect circular shape by the center judgment unit.

20. The printing device according to claim 6, wherein the image generating unit further includes:
   a center judgment unit that judges whether or not the center of the gradation is at the center of a perfect circular shape if the shape of the gradation specified by the parameters is the perfect circular shape,
   wherein the area determination unit determines, as the partial area, a semicircular area surrounded by a periphery of the perfect circular shape and a line, the line connecting the center of the gradation and the center of the perfect circular shape, if the gradation symmetry is judged to be satisfied by the symmetry judgment unit since the shape of the gradation is a perfect circular shape and if the center of the gradation is judged not to be at the center of the perfect circular shape by the center judgment unit.

21. The image generating method according to claim 11, further comprising a center judgment step of judging whether or not the center of the gradation is at the center of a perfect circular shape if the shape of the gradation specified by the parameters is the perfect circular shape,
   wherein the area determination step comprises determining, as the partial area, a semicircular area surrounded by a periphery of the perfect circular shape and a line, the line connecting the center of the gradation and the center of the perfect circular shape, if the gradation symmetry is judged to be satisfied in the symmetry judgment step since the shape of the gradation is a perfect circular shape and if the center of the gradation is judged not to be at the center of the perfect circular shape in the center judgment step.

\* \* \* \* \*